Sept. 10, 1963          C. E. STEDMAN          3,103,254
ACOUSTICAL TILE AND METHOD OF PRODUCING THE SAME
Filed Jan. 26, 1959          7 Sheets-Sheet 1
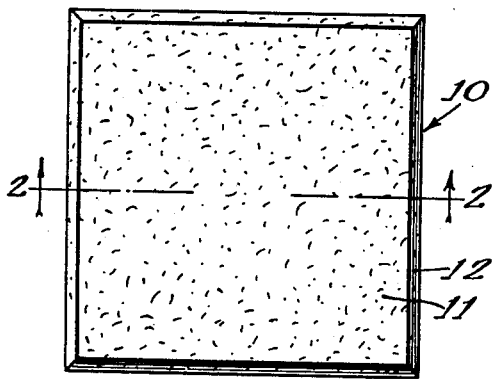
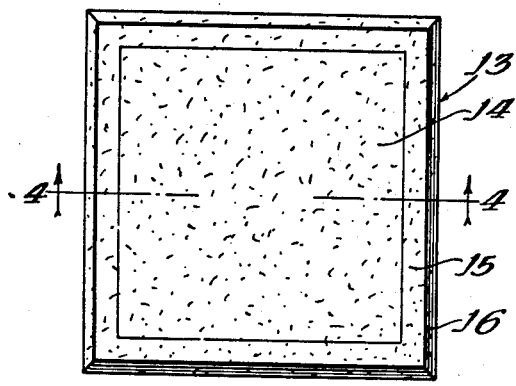
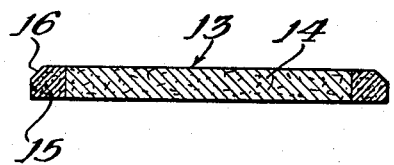
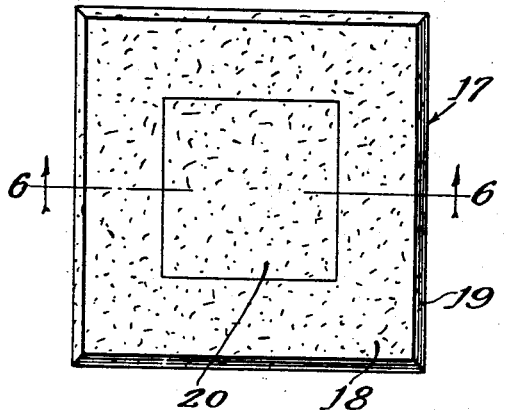
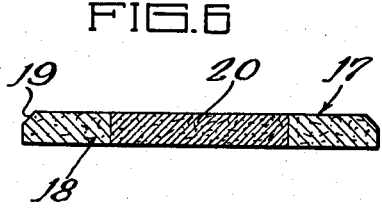
Inventor:
Cresswell E. Stedman
By: Wallace and Cannon
Attorneys Inventor:
Cresswell E. Stedman
By: Wallace and Cannon
Attorneys

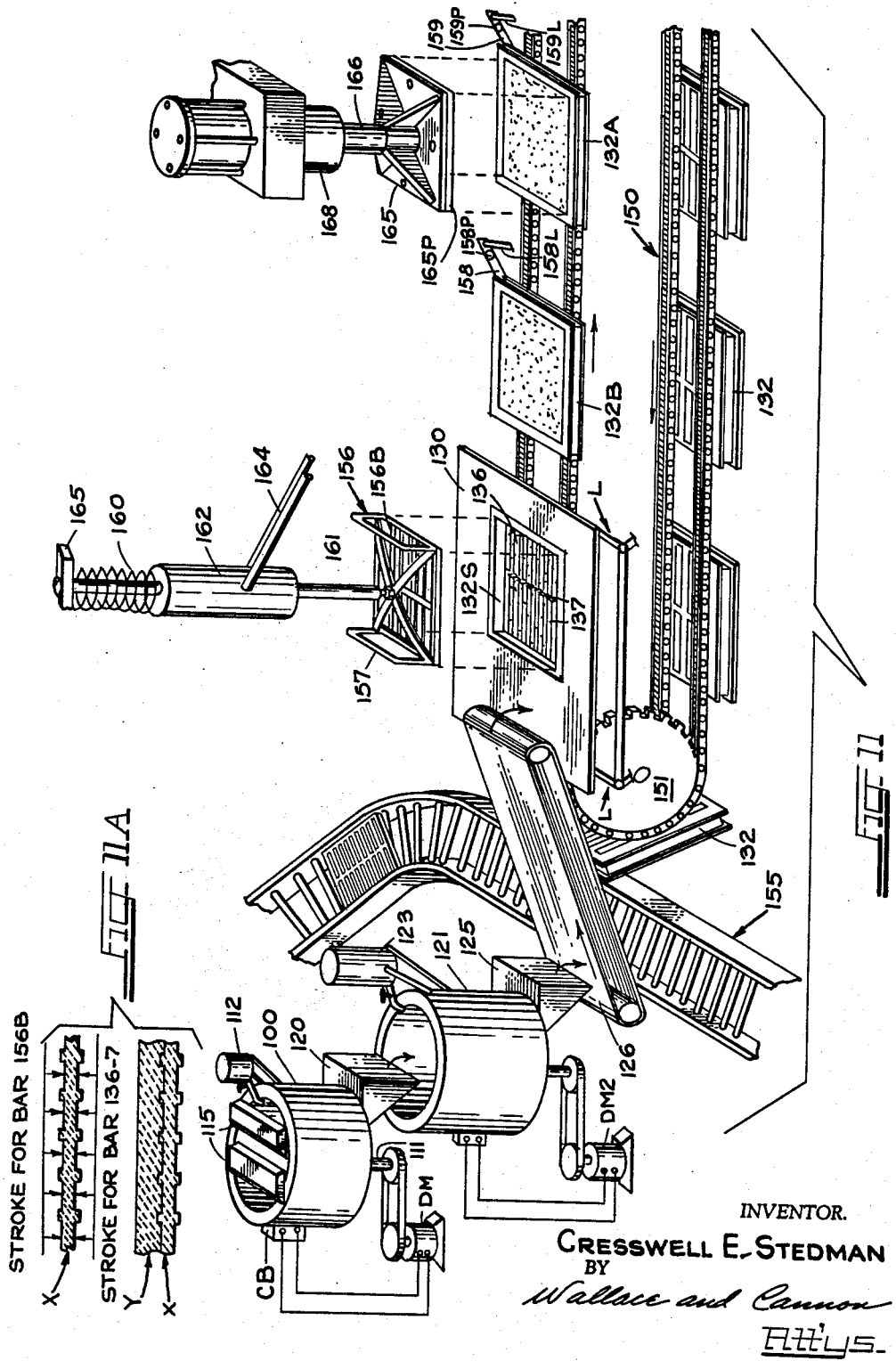

Sept. 10, 1963  C. E. STEDMAN  3,103,254
ACOUSTICAL TILE AND METHOD OF PRODUCING THE SAME
Filed Jan. 26, 1959  7 Sheets-Sheet 4
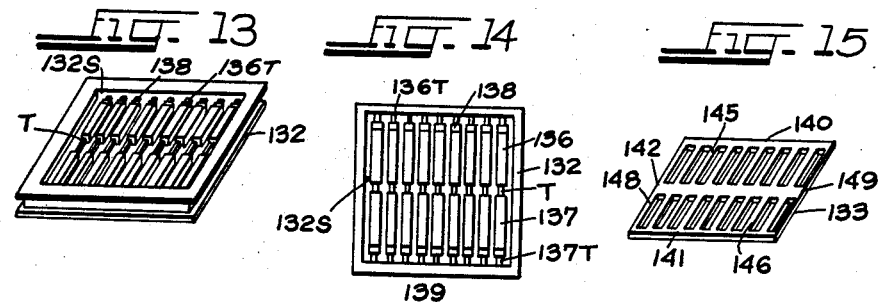
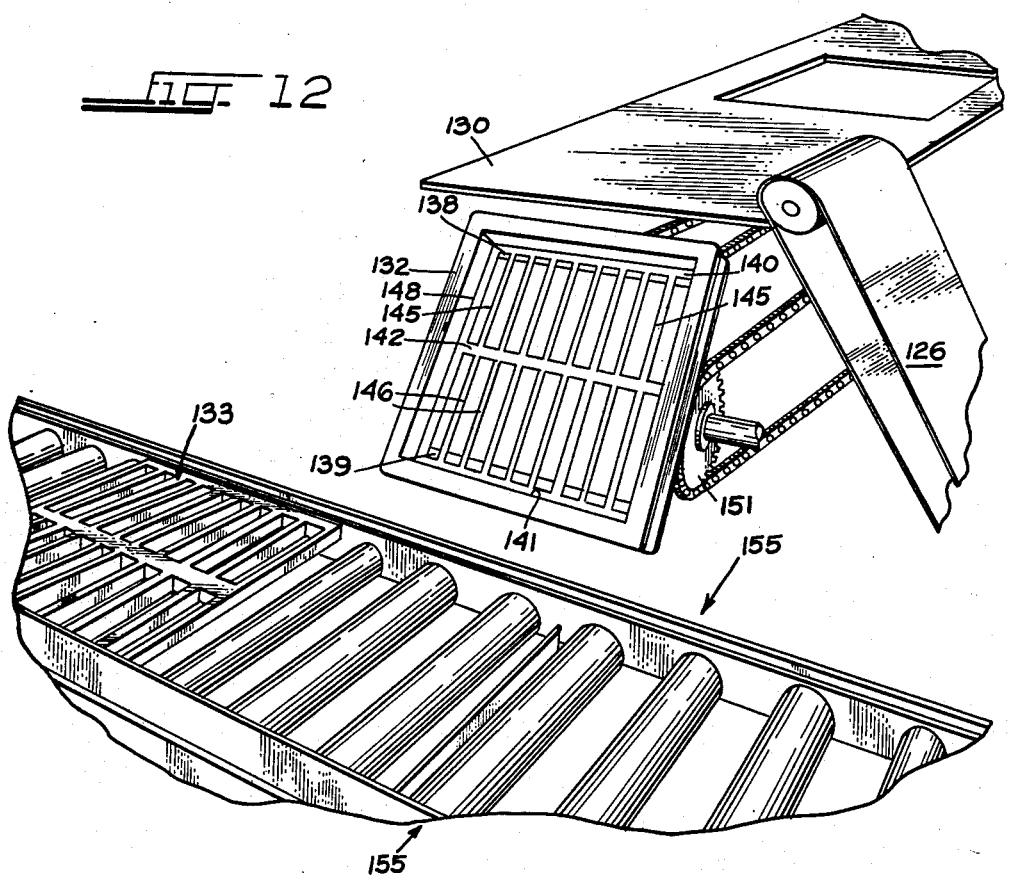
INVENTOR.
CRESSWELL E. STEDMAN
BY
Wallace and Cannon
ATTYS.

Sept. 10, 1963 C. E. STEDMAN 3,103,254
ACOUSTICAL TILE AND METHOD OF PRODUCING THE SAME
Filed Jan. 26, 1959 7 Sheets-Sheet 5
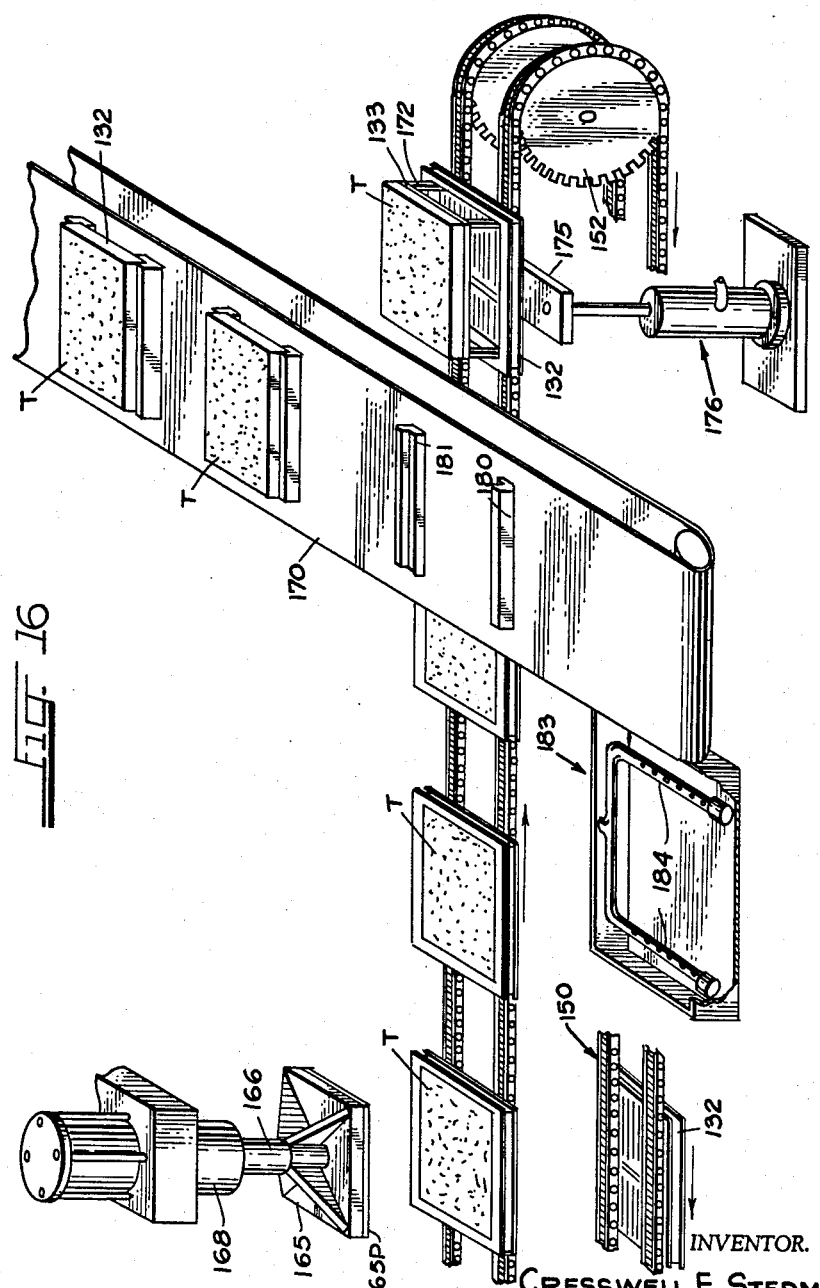
INVENTOR.
CRESSWELL E. STEDMAN
BY
Wallace and Cannon
Att'ys.

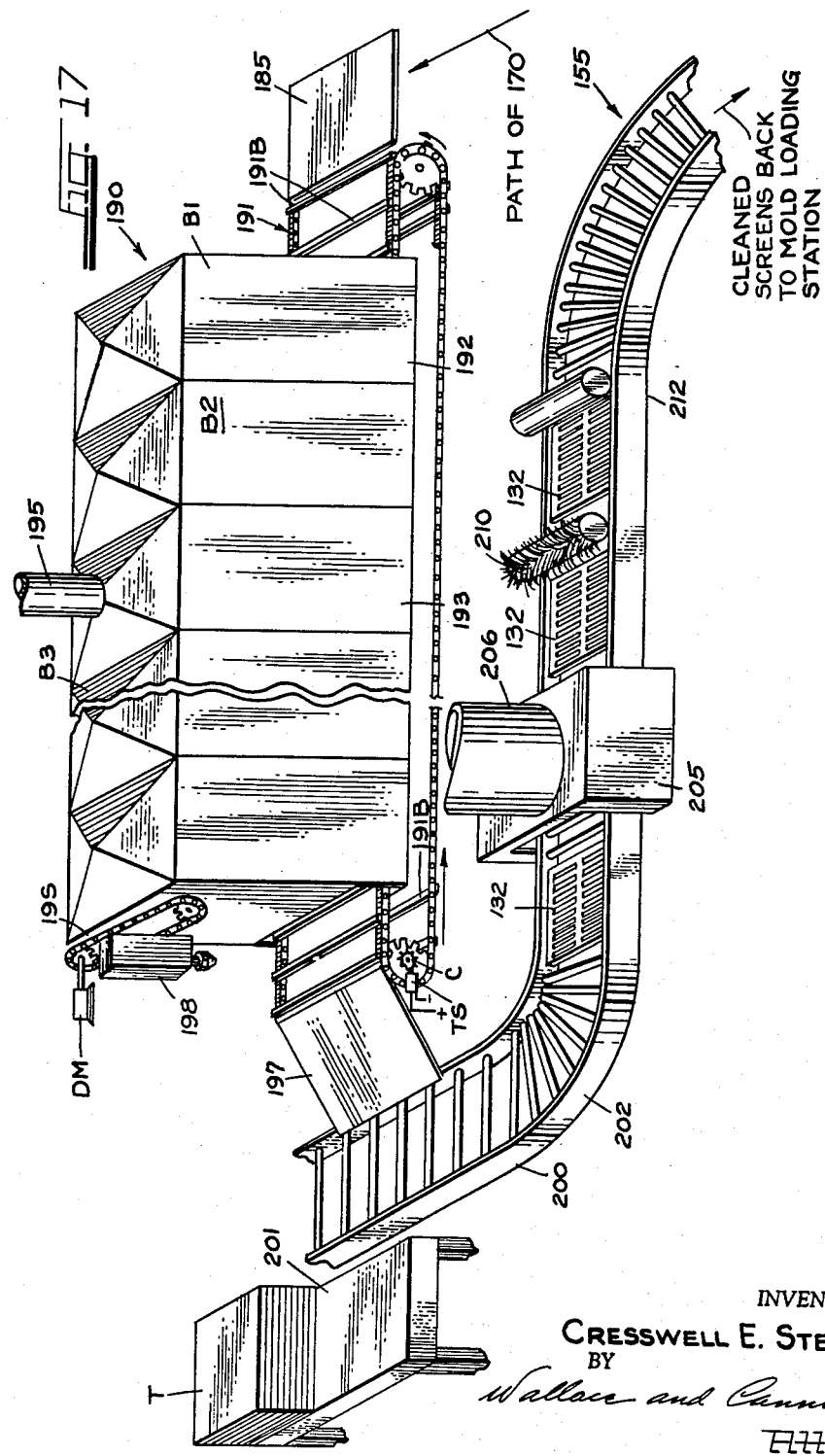

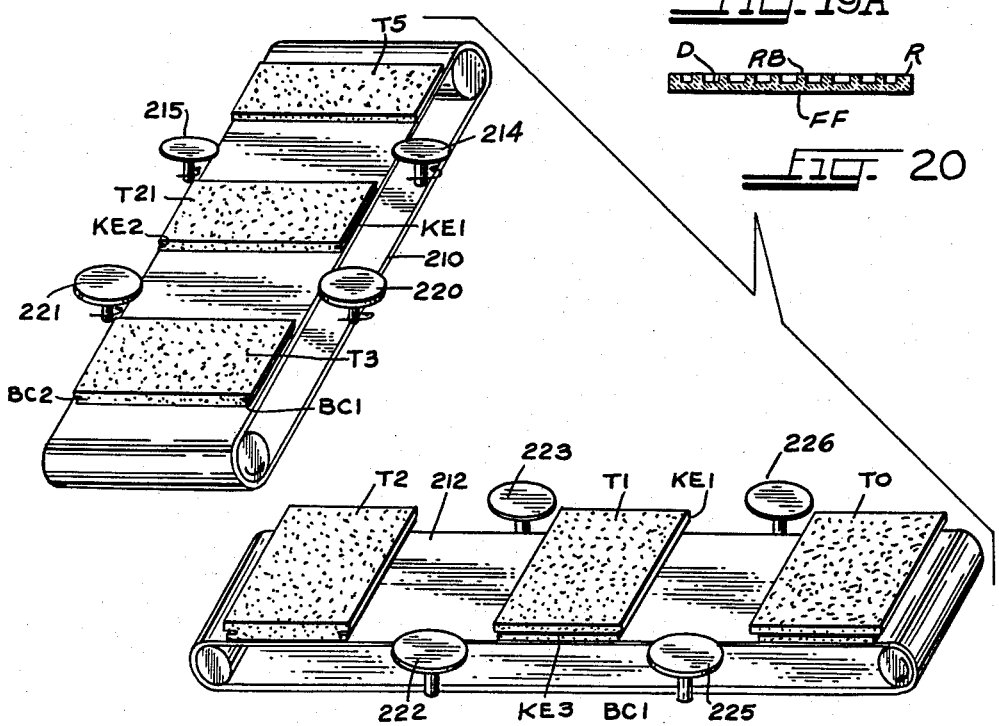

United States Patent Office 3,103,254
Patented Sept. 10, 1963

3,103,254
ACOUSTICAL TILE AND METHOD OF
PRODUCING THE SAME
Cresswell E. Stedman, Chicago, Ill., assignor, by mesne assignments, to U.S. Perlite Corporation, Chicago, Ill., a corporation of Delaware
Filed Jan. 26, 1959, Ser. No. 788,998
31 Claims. (Cl. 181—33)

This invention relates to an acoustical tile unit and to a composition and method for making the same.

This application is a continuation-in-part of and consolidates my applications Serial No. 542,321, filed October 24, 1955; Ser. No. 614,783, filed October 9, 1956; and Ser. No. 677,194, filed August 9, 1957, all three of the latter stated applications now being abandoned.

It has been known to employ various materials in the manufacture of acoustical tile and among these are mineral wools, vermiculite, perlite, asbestos, gypsum and other materials, together with various binders including sodium silicate, but notably starch and other flammable organics. However, insofar as I am aware, it has not been found possible heretofore to make a satisfactory acoustical tile using asbestos fibers, vermiculite, perlite, and sodium silicate, or like fire-resistant binder, notwithstanding the fact that the porous and other desirable characteristics of vermiculite, perlite, and asbestos fibers have been known to have desirable characteristics for the manufacture of acoustical tile.

I have ascertained that a primary difficulty in employing vermiculite, perlite, and asbestos in the manufacture of acoustical tile, with a fire-resistant inorganic mineral binder, such as an aqueous solution of an alkali metal silicate, such as sodium silicate, has been that the sodium silicate binder penetrates the fibers of the asbestos and the pores or interstices of the vermiculite or perlite mineral so that when the composition is dried the result is an ineffective hard surface or hard-walled more or less ceramic tile which has little sound-absorbing efficiency and substantially no utility as acoustical tile, and lacks dimensional stability in that it will absorb water vapor and warp, sag or buckle in use. Moreover, in the prior attempts to use vermiculite and perlite in the manufacture of acoustical tile, employing sodium silicate as a binder, the sodium silicate binder has been found to be unstable in the use of the tile, due to water-absorption, and for other reasons causing resultant swelling and warpage in the tile. I have additionally found that one of the principal reasons why perlite or vermiculite has not proven satisfactory in acoustical tile is that these are ground up and crushed during the later stages of mixing and molding, losing their initial hollow, closed pocket or envelope characteristic, and when in such a fine state lose their acoustical properties.

I have now found that a highly efficient and relatively inexpensive acoustical tile may be manufactured according to the present invention using asbestos fibers and vermiculite, or perlite, or equivalent exfoliating or expandable minerals of volcanic origin, and which are sometimes referred to as volcanic glasses, as base materials and using an alkali metal silicate as a fire-resistant inorganic mineral binder and in such a manner as to overcome the objections and difficulties heretofore experienced in attempts to use vermiculite and expanded perlite, and asbestos or equivalent materials, with a sodium silicate or equivalent alkali metal silicate binder in the manufacture of acoustical tile.

Accordingly, an object of the present invention is to provide a new improved acoustical structural building unit which is highly efficient from the standpoint of sound-absorption in the range of the sounds of normal human speech and hearing, and also in the range of low-pitched sounds, and which is particularly desirable for use in and upon the ceilings and walls of buildings where the problem of sound-absorption in the range of the sounds of normal human speech and hearing, and in the range of low-pitched sounds, is encountered. Another object is to achieve a fire proof acoustical tile containing no combustibles and composed entirely of mineral or inorganic materials and hence highly heat insulating.

Another object of the invention is to provide a new and improved acoustical tile unit in which the asbestos fiber and the vermiculite and/or expanded perlite, or equivalent material, as the mineral components thereof, are so treated that the porous, sound-absorbing characteristics and other desirable properties of both materials are retained while, at the same time, these materials, and the other materials employed therewith, are formed into an acoustical tile which has a high coefficient of sound-absorption, and the necessary stability or freedom from swelling and warpage or buckling or other dimensional changes, and which may be cemented, nailed or otherwise fastened upon the ceilings and walls of various building structures.

Further objects of the present invention are to provide a new and improved method for making the new acoustical tile, and to protect the vermiculite or perlite particles against crushing.

An additional object of the invention is to provide a new and improved acoustical tile which may be made in various sizes and which may be cemented, nailed or otherwise fastened to a ceiling or wall surface without excessive abnormal fracturing or chipping or like damage during or as a result of normal or conventional fastening operations.

A further object of the invention is to provide in one form thereof a reinforced acoustical tile unit in the form of an acoustical tile board which may be made not only in the form of ceiling and wall tile of conventional sizes but also in relatively larger sizes such, for example, as slabs or panels two feet square, and which may be readily cemented, nailed, or otherwise fastened to or suspended from a ceiling or wall surface without warping, buckling, fracturing, chipping or sagging.

Other objects will appear hereinafter.

FIG. 1 is a plan view of an acoustical tile embodying a typical form of the present invention;

FIG. 2 is a transverse sectional view thereof on line 2—2 in FIG. 1;

FIG. 3 is a plan view of another embodiment of the invention;

FIG. 4 is a sectional view on the line 4—4 of FIG. 3;

FIG. 5 is a plan view of another embodiment of the invention;

FIG. 6 is a sectional view on the line 6—6 of FIG. 5;

FIG. 11 is a schematized perspective view of certain equipment used in the manufacture of tile under the present invention;

FIG. 11A shows different states of the material undergoing preliminary densification;

FIG. 12 is a perspective view on an enlarged scale in comparison to FIG. 11 and illustrating details of equipment at the mold loading station;

FIG. 13 is a perspective view of a mold tray;

FIG. 14 is a top plan view of the mold tray shown in FIG. 13;

FIG. 15 is a perspective view of a pallet screen used under the present invention;

FIG. 16 is a schematized perspective view illustrating further details of processing equipment used in practicing the present invention;

FIG. 17 is another schematized perspective view illustrating still further details of equipment used in practicing the present invention;

FIG. 18 is a perspective view of an acoustical tile produced under the present invention;

FIG. 19 is a bottom plan view of the tile shown in FIG. 18;

FIG. 19A is a sectional view taken on the line 19A—19A of FIG. 19;

FIG. 20 is a perspective view of equipment used in the kerfing station; and

FIG. 21 is a fragmentary sectional view illustrating the manner in which two tile under the present invention are to be suspended from a ceiling.

A typical embodiment of an acoustical structural building unit in the form of an acoustical tile made in accordance with the present invention is illustrated in FIGS. 1 and 2 of the drawings, where it is generally indicated at 10, and comprises a body 11 of suitable size, shape and thickness, which may have a molded beveled edge 12, and is adapted to be cemented, or otherwise fastened, or suspended, in any suitable manner, upon the ceiling or wall of a building such, for example, as an office, restaurant, hotel, auditorium, or the like, where the problem of deadening sound in the range of the sounds of normal human speech and hearing, and also in the range of low-pitched sounds, is encountered.

A preferred composition which may be employed in making the acoustical tile illustrated in FIGS. 1 and 2 is illustrated in and by the following example:

EXAMPLE NO. 1

To produce an acoustical tile in accordance with the practice of the present invention, and which is ⅞" thick by 12" x 12" square, 12.5 oz. of No. 3 vermiculite particles, known as the so-called Industrial grade American Standard and 3 oz. of No. 7DO4 asbestos fibers (Canadian Standard) are thoroughly mixed. The particle size of the vermiculite referred to above should be in the intermediate mesh size or range of 16–30–50, as more particularly referred to hereinafter. During the mixing operation the small plates or platelets of vermiculite and the asbestos fibers adhere to each other such that the asbestos fibers when permanently adhered to the particles of vermiculite, as will be explained, form composite bodies in which the asbestos fibers form a protective pile array about the outside of the particles preserving the hollow body or initial particle construction which has highly advantageous acoustical properties.

Figures 10, 10A:
FIG. 10 is a showing based on microscope studies of the nature of the composite bodies making up acoustical tile of the present invention.
FIG. 10A is a showing of another form of composite bodies making up acoustical tile of the present invention.

The mixture thus formed is then sprayed, preferably by means of a spray gun, or the like, with a fine spray of a fire-resistant and water-repellent coating composition such, for example, as an organic water-soluble so-called silicone resin, and for this purpose I have found that a so-called organic water-soluble silicone resin known as Dow Corning No. XS–1 is very satisfactory, this material being a water solution of sodium salts of organo-silanols and organosiloxanols. This coating composition represents the first inner coating surface and bonds the asbestos fibers in place on the outside of the vermiculite particles, forming composite bodies wherein the vermiculite (or perlite) particles are insulated one from another so as not to grind one on the other during further mixing and molding. These bodies are shown in FIG. 10 as microscope representations wherein the vermiculite (or perlite) particles P are surrounded by asbestos fibers A in intimate bonded contact therewith. The mixing operation is continued during this spraying operation forming more and more of the composite bodies and until the mixture becomes somewhat darker in color and all of the asbestos fibers and the vermiculite particles have been well coated and rendered water-resistant or water-repellent by the silicone resin material. The mixture thus formed is then heated to a temperature of 150° F., and is maintained at this temperature for a period of about fifteen minutes, and until it is thoroughly dried, this drying temperature being capable of being varied from 120° F. to 150° F. for the time stated, whereupon the mixture is again mixed or agitated until it assumes the form of a light fluffy mass.

A binder in the form of an aqueous solution of sodium silicate is then thoroughly mixed with the composition prepared as above to provide the next outer coating surface on the bodies, and for this purpose I have found that for the quantities of vermiculite and asbestos indicated above, from 24 to 28 oz., with an optimum of 26 oz., of an aqueous solution of sodium silicate, known as the so-called No. 40 (Diamond Alkali Company) sodium silicate, is very satisfactory, this material having a specific gravity of 40.00–41.5 Bé. 1.38–1.40 with an average solids content of 37.5 percent. This mixing operation is continued for a period of about five minutes whereupon the composition assumes a golden brown color.

The mold is then filled with the asbestos-vermiculite composite bodies, prepared and treated as above, and the thus filled mold is then compressed to a thickness of ⅞", whereupon the thus formed acoustical tile shape can be placed in a drying oven on a flat metal pallet and thoroughly dried at a temperature of preferably not in excess of 200° F. for a period of from 6 to 8 hours, after which it is allowed to cool gradually to room temperature in the drying oven. This procedure has been found to be effective in preventing warping of the tile and in producing a uniformly flat acoustical tile, and during consolidation of the mass of composite bodies the asbestos pile surface on the particles P, FIG. 10, preserves and maintains the original formation of the particles P and maintains some spacing between the particles P in the final product thereby affording many voids permitting sound to penetrate the consolidated acoustical tile product.

After the resulting tile form or shape has been thus dried and allowed to cool I have found, in one mode of practice of the present invention, and to produce stability and resistance to moisture absorption in the binder and freedom from warpage and buckling in the new tile, it should be treated with a three percent aqueous solution of magnesium silico-fluoride (magnesium fluosilicate), which may be applied in any suitable manner, as by spraying, at an air pressure of 60 lbs., so as to thoroughly impregnate the entire mass including the sodium silicate binder. The exact nature of the action of the magnesium silico-fluoride (magnesium fluosilicate) on the composition is not known but it is believed to react at least partially with the sodium silicate binder to provide a binder material which is highly stable and resistant to absorption of moisture or water vapor while, at the same time, eliminating the hard, glossy outer surface formed on the tile shapes by the sodium silicate binder and providing an outer surface on the new acoustical tile shapes which is of a soft, porous texture and has good acoustical properties. The new tile form or shape may then also, if desired, be provided with a suitable colored surface coating such, for example, as a water-soluble casein paint of any desired color, or the like, to impart any desired color thereto.

In making the new acoustical tile in accordance with the foregoing Example No. 1, and in the dimensions stated, and in the particle size hereinafter referred to, the amount of the vermiculite employed should not be less than 10 oz. nor more than 14 oz., since if the amount of vermiculite is less than 10 oz. the resulting tile will be too fragile and if it is more than 14 oz., the resulting tile will be too dense.

It has been found that the new acoustical tile embodying the composition and made in accordance with the method set forth above is a highly efficient fire-resistant, structurally strong and stable, and thoroughly water-repellent and water vapor-repellent acoustical tile having a high coefficient of sound absorption at both the low frequencies and the high frequencies at which sound absorption coefficients are customarily specified.

It has been further found that by providing the mixture of asbestos and vermiculite (or perlite as will be explained) with a water-repellent coating prior to the time the binder in the form of an aqueous solution of sodium silicate is incorporated therewith, a greatly improved acoustical tile is afforded. This action or phenomenon is believed partly due to the fact that when the asbestos-vermiculite or asbestos-perlite composite body base is thus treated with the water-repellent composition, the sodium silicate binder is prevented from penetrating into and filling up the pores and interstices in the vermiculite and in the asbestos fibers so that the naturally occurring and inherent voids in these materials are left open and unfilled and serve, in the finished acoustical tile, to provide sound-absorbing areas or interstices, and thus enhance the sound-absorbing and sound-deadening efficiency of the resulting product.

It is now apparent, however, that the major effect is due to the secured or bonded pile effect of the asbestos about the acoustical vermiculite (or perlite) particles. These particles are originally hollow or of closed pocket or envelope, highly fragile form. If safeguarded against grinding contact one on the other, as is accomplished by the asbestors pile surface, the original form is maintained and there is spacing between the particles in the final product. The hollow nature is particularly so where the particles are of the expanded type, but even if perchance hollow particles are not always present, the asbestos pile layer prevents rupture of the fragile particles during mixing and pressing, thereby maintaining the original particle size, and assures spacing between the composite bodies in the final consolidated tile product.

At the same time, the new acoustical tile is rendered thoroughly water-repellent and water vapor-repellent and fire-resistant and highly stable by treatment in the manner set forth in the foregoing Example No. 1 by treatment with the aforesaid organic silicone resin and with the magnesium silico-fluoride composition, without interfering with the desired acoustical characteristics of the finished tile.

By the term "vermiculite," as used herein is meant the naturally occurring micaceous mineral of this name which is chemically a hydrated magnesium silicate of somewhat indefinite and variable but characteristic composition found in Montana and North Carolina, and perhaps elsewhere, and which when expanded by heat to about 2000° F. forms a refractory product which is highly resistant to fusing under high temperatures (Condensed Chemical Dictionary, fourth edition (1950), Reinhold Publishing Corp., page 693). Also included within the term "vermiculite," as herein used, are certain commercial forms of vermiculite which are, mineralogically, hydrobiotites.

EXAMPLE NO. 2

As a modification of the procedure set forth in the foregoing Example No. 1, I may place in the mold a quantity of the asbestos-vermiculite composite body mixture (treated with the water-soluble silicone resin and sodium silicate binder) sufficient to fill the mold only approximately half full and then spread over the surface of the material in the half-filled mold a relatively thin layer of the asbestos-vermiculite composite body mixture which has been treated with the water-repellent silicone resin but not with the sodium silicate binder. For this purpose one-half (½) ounce of the asbestos-vermiculite composite body mixture treated with the water-repellent silicone resin is sufficient. The mold may then be completely filled with the asbestos-vermiculite mixture treated with the water-repellent silicone resin and sodium silicate binder, and the operation of forming the new acoustical tile completed in the manner set forth in the foregoing Example No. 1.

I have found that the new acoustical tile, made in accordance with the practice set forth in the foregoing Example No. 2, enhances the sound-absorbing characteristics of the new acoustical tile by affording a mass of air spaces in the middle body portion of the tile which is of particular advantage in those instances in which it is contemplated that the new acoustical tile will be used without an auxiliary air space behind it where it is planned to rely for sound-absorption entirely on the sound-absorption characteristics of the new acoustical tile itself and an acoustical tile of high sound absorption and sound-deadening characteristics is, therefore, desired.

EXAMPLE NO. 3

In this example the same procedure and steps may be followed as are employed in either of the foregoing Examples Nos. 1 and 2 except that 15 oz. of so-called grade No. 3 vermiculite and 3 oz. of asbestos of the so-called grade No. 7DO4 may be employed in preparing an acoustical tile 12″ x 12″ in size and ⅞″ thick.

EXAMPLE NO. 4

In place of the aqueous solution of magnesium silicofluoride, $MgSiF_6 \cdot 6H_2O$, referred to in the foregoing Example No. 1, I may employ as a substitute therefor an aqueous solution of ammonium silicofluoride (ammonium fluosilicate), $(NH_4)_2SiF_6$, and for this purpose I may employ a one percent aqueous solution of the same ammonium silicofluoride, according to the same procedure set forth in the foregoing Example No. 1.

EXAMPLE NO. 5

In place of the aqueous solution of magnesium silicofluoride set forth in the foregoing Example No. 1, I may employ a dilute aqueous solution of hydrochloric acid, according to the same procedure set forth in the foregoing Example No. 1, and for this purpose I have found that a one percent aqueous solution of hydrochloric acid is satisfactory.

In making the new acoustical tile the best acoustical values and greatest strength are obtained when the particle size of the vermiculite is in the intermediate size or range of 16–30–50, as specified in the foregoing Example No. 1.

In making the new acoustical tile in accordance with the formulae set forth above, in Examples Nos. 1 to 5, inclusive, the particle size of the vermiculite employed is preferably that which is described below as the "Intermediate Particle Size," although vermiculite having the particle sizes between the maximum and minimum mesh sizes hereinafter referred to may also be employed, although less advantageously:

*Maximum Particle Size*

| | |
|---|---|
| Mesh size | 8–16–30 |
| Maximum percentage of particles retained on screen | 80–99–100 |
| Minimum percentage of particles retained on screen | 20–57–90 |

*Intermediate Particle Size*

| | |
|---|---|
| Mesh size | 16–30–50 |
| Maximum percentage of particles retained on screen | 60–95–98 |
| Minimum percentage of particles retained on screen | 20–65–75 |

*Minimum Particle Size*

| Mesh size | 30–50–100 |
|---|---|
| Maximum percentage of particles retained on screen | — — — |
| Minimum percentage of particles retained on screen | 15–60–90 |

A modification of the invention is illustrated in FIGS. 3 and 4 of the drawings and embodies the same composition and may be made by either of the methods outlined in the foregoing Examples Nos. 1 and 2 except that in this instance the composition when placed in the mold is spread and compacted from the center radially outwardly to the walls of the mold so as to provide a relatively dense compacted marginal peripheral edge portion 15 in the finished acoustical tile. Thus, in this form of the invention the tile 13 includes a central body portion 14, which is shown as being rectangular in shape, and which has the same density as the body 11 of the tile 10 shown in FIGS. 1 and 2, but differs there from in having a relatively dense and compacted marginal peripheral edge portion 15 formed by packing the composition around the peripheral edge portion of the mold. This relatively dense marginal or peripheral edge portion 15 may be provided with a suitable beveled edge 16.

The provision of the relatively dense marginal edge portion 15, surrounding the center portion 14 of relatively lower density, provides for better sound-absorption at low a swell as high speech frequencies and provides the tile 13 with a sharp strong marginal edge portion 15 which is useful in machining the tile and in fastening it in position of use as by nailing or the like. Other forms of variable density in the tile will be set forth hereinafter.

A further modification of the invention is illustrated in FIGS. 5 and 6 of the drawings, wherein the tile is generally indicated at 17, and includes a generally rectangular-shaped outer body portion 18 having a beveled edge portion 19. The body portion 18 has the same composition as the body portion 11 in the form of the invention shown in FIGS. 1 and 2, or the body portion 14 in the form of the invention shown in FIGS. 3 and 4 of the drawings.

However, in the form of the invention shown in FIGS. 5 and 6 of the drawings I provide the new tile with a generally rectangular-shaped and relatively dense center portion 20 which may have the same relatively high density as the peripheral edge portion 15 of the tile 13 shown in FIGS. 3 and 4 of the drawings, and which enhances the ability or capacity of the resulting tile 17 to absorb and deaden sounds or sound vibrations in the higher ranges of the sound frequencies inherent in human speech.

Figure 7:
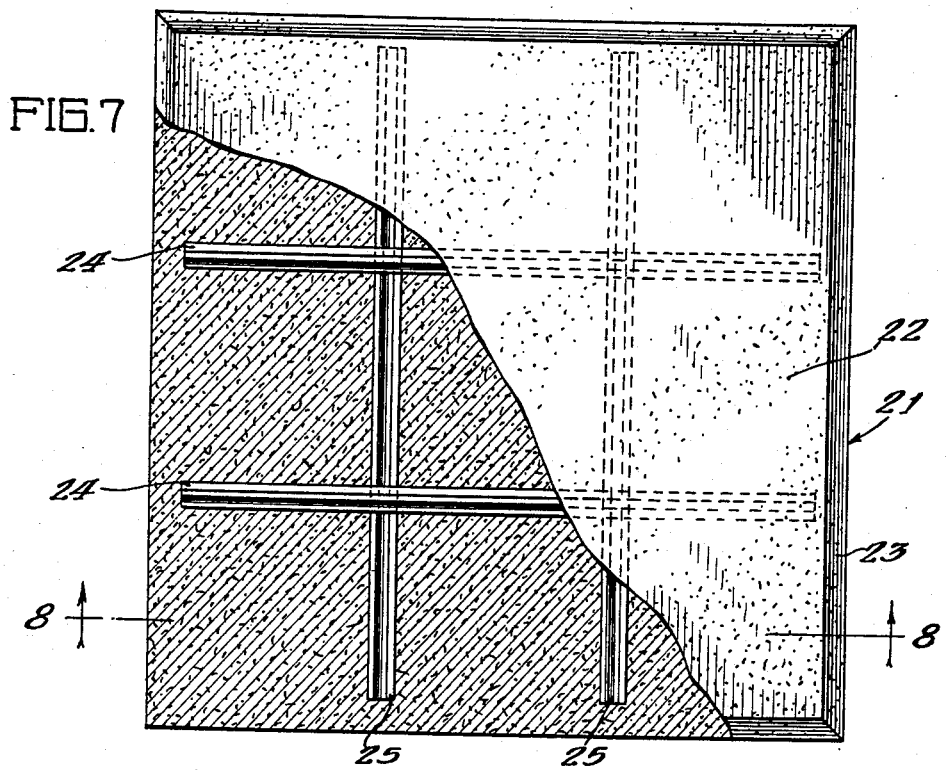
FIG. 7 is a plan view of a modification of the invention, in the form of an acoustical building board, with a part of the body of the new acoustical building board broken away to show the reinforcing construction embodied therein.
Figure 8:
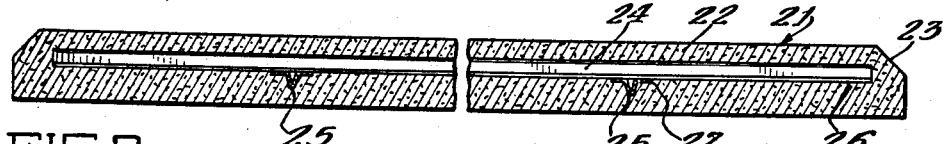
FIG. 8 is a sectional view on line 8—8 in FIG. 7.
Figure 9:
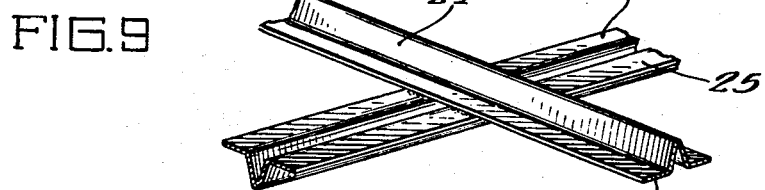
FIG. 9 is a perspective view illustrating the arrangement of the reinforcing members embodied in the form of the invention shown in FIGS. 7 and 8.

A further modification of the invention is illustrated in FIGS. 7, 8 and 9 of the drawings, wherein it is generally indicated at 21, and comprises an acoustical tile body 22 which may embody the composition of and may be prepared in accordance with any of the foregoing Examples Nos. 1, 2, 3, 4 and 5, and may be provided with a suitable beveled edge 23. However, in this form of the invention I incorporate in the body of the title reinforcing bars 24 and 25, which have base flanges 26 and 27, respectively, and are generally V-shaped in cross section and may be made of a suitable aluminum alloy or other relatively light, corrosion-resistant materials such as thermosetting resins. As shown in FIGS. 7, 8 and 9 of the drawings the reinforcing bars 24 and 25 may be arranged in groups of right-angularly intersecting bars with their base flanges 26 and 27 arranged in superimposed contacting relationship.

In the use of the form of the invention shown in FIGS. 7, 8 and 9 I have found that the new acoustical tile units 21 may be made in relatively large sizes such, for example, as 2′ by 2′ square, and when fastened to or suspended from a ceiling or wall surface have adequate structural strength such that they will not sag or crack while, at the same time, possessing the desirable acoustical and fire-resistant properties and other characteristics hereinbefore mentioned.

In the practice of the present invention I have found that in place of the vermiculite specified in the foregoing examples I may also employ perlite, which is a naturally occurring form of volcanic rock from the western part of the United States and is classified as a perlitic obsidian glassy rhyolite or related silicic glassy volcanic rock varying in texture from porphyritic to glassy gray with pearly luster and containing a small proportion of water and when crushed (as mined) and carefully heated to a high temperature expands to a lightweight cellular material which is from 10 to 20 times its original volume and resembles rock wool in texture. (Condensed Chemical Dictionary, fourth edition (1950), Reinhold Publishing Company, page 509.) The naturally occurring perlite is mostly found in compacted or unexpanded form but when heated properly to a temperature of about 1600° F. it expands significantly and is sold and used industrially in this form, known as unshattered expanded perlite, which is the form I have found most useful in the practice of the present invention, and which is referred to hereinafter in the following examples, although I may also use the naturally occurring expanded perlite if the same is screened to provide a product having the desired particle size herein referred to.

Thus, in the practice of the present invention I may make the new acoustical tile employing expanded perlite, in accordance with the formulae illustrated in the following examples in which all parts indicated are by weight:

EXAMPLE NO. 6

In making the new acoustical tile employing expanded perlite, in place of the vermiculite specified in Examples Nos. 1 to 5, inclusive, the same procedures and conditions set forth in Example No. 1 may be employed except that in this instance I employ with the asbestos fiber specified in Example No. 1 8 oz. of screened expanded perlite having a particle size of minus 8 plus 30 mesh produced from a raw perlite ore known as PA6 (Schundler) plus 3 oz. of screened expanded perlite known as "O" grade (American Bildrok) and produced from an ore known as PA100 (Schundler) having a mesh size of approximately 100 and having a weight per cubic foot of from 3 to 5 pounds per cubic foot.

The screened expanded perlite produced from the ore known as PA6 (Schundler), referred to above, has the following (American Bildrok) screen analysis:

| Mesh size | 8 | 16 | 30 | 50 | 100 | 100— |
|---|---|---|---|---|---|---|
| Cumulative percentage of particles retained on screen, by volume | trace | 44–73 | 80–95 | 92–100 | 96–100 | 0–4 |
| Typical screen analysis | trace | 60 | 90 | 98 | 100 | trace |

The screen analysis on the screened expanded perlite known as "O" grade (American Bildrok) and produced from an ore known as PA100 (Schundler) is as follows:

| Mesh size | 16 | 30 | 50 | 100 | 200 | 200— |
|---|---|---|---|---|---|---|
| Cumulative percentage of particles retained on screen, by volume | 2–7 | 10–54 | 55–81 | 88–97 | 97–100 | 0–3 |
| Typical screen analysis | trace | 35 | 75 | 92 | 97–100 | 2 |

EXAMPLE NO. 7

In making the new acoustical tile employing expanded perlite I may employ with the asbestos fiber in place of the materials specified in the foregoing Example No. 6, and following the same procedure referred to therein and in Example No. 1, 12 oz. of screened expanded perlite produced from the raw perlite ore known as PA6 (Schundler) having a particle size of minus 8 plus 30 mesh and having a weight per cubic foot of from 5 to 7 pounds.

EXAMPLE NO. 8

I may also make the new acoustical tile according to the procedures set forth in the foregoing Examples Nos. 1 and 6 except that in this instance I may employ with the asbestos fiber in place of the materials specified in Example No. 6 6 oz. of screened expanded perlite produced from the raw perlite ore known as PA6 (Schundler) having a particle size of minus 8 plus 30 mesh and having a weight per cubic foot of from 5 to 7 pounds per cubic foot, together with 6 oz. of screened expanded perlite known as "0" grade (American Bildrok) having a mesh size of approximately 100 and having a weight of from 3 to 5 pounds per cubic foot.

EXAMPLE NO. 9

In place of the materials specified in the foregoing Example No. 6, but following the same procedure therein set forth, and in Example No. 1, I may employ with the asbestos fiber, 12 oz. of unscreened expanded perlite produced from raw perlite ore (PA6—Schundler) having an expanded weight of from 6.5 to 8.5 pounds per cubic foot having the following screen analysis:

| Mesh size | 4 | 8 | 16 | 30 | 50 | 50(−) |
|---|---|---|---|---|---|---|
| Cumulative percentage of particles retained on screen, by volume | 0–2 | 14–55 | 52–84 | 75–95 | 88–98 | 2–13 |
| Typical screen analysis | trace | 33 | 70 | 80 | 92 | |

EXAMPLE NO. 10

In place of the materials specified in the foregoing Example No. 6, but using the same procedures therein specified and in Example No. 1, I may employ with the asbestos fiber, 12 oz. of unscreened expanded perlite produced from raw perlite ore known as PA3 (Schundler) having a weight of from 5 to 7 pounds per cubic foot and having the following screen analysis:

| Mesh size | 8 | 16 | 30 | 50 | 100 | 100(−) |
|---|---|---|---|---|---|---|
| Cumulative percentage of particles retained on screen, by volume | 0–2 | 15–25 | 35–65 | 65–90 | 90–100 | 0.10 |
| Typical screen analysis | trace | 22 | 58 | 80 | 95 | 5 |

In the practice of the present invention I may also employ mixtures of vermiculite and expanded perlite. Thus the new acoustical tile may be made in accordance with the following examples in which all parts indicated are by weight:

EXAMPLE NO. 11

In making the new acoustical tile employing a mixture of vermiculite and expanded perlite I may follow the procedure set forth in the foregoing Example No. 1 but employing a mixture of 6 oz. of No. 3 vermiculite within the particle sizes set forth in Example No. 1, and 5 oz. of expanded screened perlite of a mesh size of minus 8–plus 30, as the maximum particle size.

EXAMPLE NO. 12

In making the new acoustical tile in accordance with the present invention I may also employ the procedures set forth in Example No. 1 but employing a mixture of 6 oz. of vermiculite having a mesh size of 30–50–100 and 6 oz. of expanded screened perlite having a mesh size of minus 8–plus 30, as above described.

EXAMPLE NO. 13

I may also make the new acoustical tile following the procedures set forth in the foregoing Example No. 1 but employing a mixture of 3 oz. of vermiculite having a mesh size of 16–30–50 and 9 oz. of expanded screened perlite having a mesh size of minus 8–plus 30, as above described.

EXAMPLE NO. 14

I may likewise employ a mixture of 3 oz. of vermiculite having a mesh size of 16–30–50 and 9 oz. of expanded perlite having a mesh size of minus 8–plus 30, as above described.

In making the new acoustical tile employing a mixture of vermiculite and expanded screened perlite, as in the foregoing Examples Nos. 11, 12 and 13, the particle sizes of the vermiculite and of the expanded screened perlite are preferably in the intermediate range, as set forth above, in order to afford the best acoustical values and the greatest strength in the new acoustical tile.

As hereinbefore indicated, I may employ naturally occurring expanded perlite in any and all of the foregoing Examples Nos. 6 to 14, inclusive, and in the same amounts, or mixtures of the two forms of perlite referred to above, provided the material has been screened to the proper particle sizes above set forth.

It has been determined, by standard reverberation room tests made by a recognized acoustical laboratory, that the Noise Reduction Coefficient (N.R.C.) of an acoustical tile made in accordance with the foregoing Example No. 1, employing vermiculite, was 0.75 for a No. 7 mounting and 0.65 for a No. 2 mounting. The definitions of these terms are those given in Bulletin No. XVI of the Acoustical Materials Association, pages 5 and 6. The tile tested were 12″ x 12″ x ⅞″ in size and had a density of 1.6 pounds per square foot, unpainted. The area tested was 72 square feet.

In another test by the same acoustical laboratory, made with an acoustic tube in accordance with the A.S.T.M. Standard Method of Test for Impedance and Absorption of Acoustical Materials by the Tube Method, on a specimen of the new acoustical tile made in accordance with the foregoing Example No. 6, and employing expanded perlite, rather than vermiculite, the statistically computed N.R.C. was 0.60. The test was made on an unpainted specimen of tile 12″ x 12″ x ¾″ with a ⅛″ air space behind the specimen.

In the case of acoustical tile made in accordance with the foregoing Examples Nos. 7 and 8, and employing a mixture of vermiculite and expanded perlite, an acoustic tube test by the same laboratory on two specimens of the new acoustical tile gave an N.R.C. of 0.635. The specimens were 12″ x 12″ x ⅞″, unpainted, and the air space behind the tile was one inch.

I have also found that an improved and even more highly dimensionally stable, water-resistant and moisture-resistant acoustical tile may be made by the addition of urea to the sodium silicate binder employed in the foregoing examples. This aspect is disclosed in detail in my application Ser. No. 677,194, but the following examples will suffice to explain fully the use of a binder employing an aqueous dispersion of sodium silicate modified by the presence of urea. Moreover, the example immediately following will describe what I have found to be a highly advantageous drying procedure for drying the corresponding molded tile product.

EXAMPLE NO. 15

The general procedure outlined in Example No. 1 is followed up to the point where the final binder is to be employed, and instead of the binder of Example No. 1, a binder is prepared in the form of an aqueous solution or mixture of sodium silicate and urea which is then thoroughly mixed with the composite bodies prepared as above. For this purpose I have found that for the quantities of vermiculite and asbestos indicated above in Example No. 1, from 20 to 28 oz., with an optimum of 26 oz., of an aqueous solution of sodium silicate, known as the so-called No. 40 (Diamond Alkali Company) sodium silicate, mixed with one (1) ounce of a water solution of urea, which will be described hereinafter, is very satisfactory, the sodium silicate solution, before addition of the urea solution, having a specific gravity of 1.38–1.40 (40.00–41.50 Bé.) with an average solids content of 37.5 percent. The urea solution is prepared by thoroughly mixing one to two ounces of urea prells (Grace Chemical Company, Technical Grade) in one pint of water (preferably distilled). The operation of mixing the treated vermiculite and asbestos with the sodium silicate-urea binder is continued for a period of from one to two minutes, whereupon the composition assumes a golden brown color.

A heat-resistant metal screen is set in complementary recesses in a grid in the bottom of a mold which is then filled with the asbestos-vermiculite-binder composition, prepared in accordance with this example. The composition is then compressed to a thickness of ⅞", whereupon the resultant tile and screen are removed from the mold by knock-out pins and placed in an infra-red drying oven, at 500 watts, for an initial heating period of twelve (12) minutes at a temperature which does not exceed, at this stage 210° F. in the tile body. The heat is then off for a period of six (6) minutes, whereupon the heat is then reapplied at 500 watts, for a further period of six (6) minutes. The heating operation is then discontinued for a period of six (6) minutes and the on-off heating cycle then continued for a total on-off heating time of sixty (60) minutes including the initial six (6) minutes. During the final stages of the heating operation the temperature in the tile body may reach 320° F. or higher. This results in complete cure of the tile. After drying, the tile and screen are separated. This procedure, further details of which are set forth below, has been found to be highly effective in preventing warping of the tile, which is otherwise highly susceptible to distortion during drying, and in producing a uniformly flat acoustical tile.

After the resulting tile form or shape has been thus dried, but is still hot, I have found, that to further enhance the desired stability and resistance to moisture absorption in the binder, and freedom from warpage and buckling in the new tile, it should be treated as in Example No. 1 with an aqueous solution of magnesium silicofluoride (Magnesium fluosilicate) (from 3 to 20 percent), which may be applied as by spraying the dried tile, or preferably added to urea as will be explained, so as to thoroughly impregnate the entire mass including the sodium silicate-urea binder.

The procedures set forth in Example No. 15 can be likewise substituted in other of the examples following Example No. 1. The amount of the urea solution used with the sodium silicate solution can be varied, and the concentration of the urea solution can be varied by employing more or less of the urea prells. Moreover, an aqueous solution of ammonium silicofluoride (ammonium fluosilicate) or hydrochloric acid can be substituted for magnesium silico-fluoride, thusly:

EXAMPLE NO. 16

In place of the aqueous solution of magnesium silicofluoride, $MgSiF_6 \cdot 6H_2O$, referred to in Example No. 15, an aqueous solution of ammonium silicofluoride (ammonium fluosilicate), $(NH_4)_2SiF_6$, can be used. For this purpose I may employ a one percent aqueous solution of the said ammonium silicofluoride, according to the same procedure set forth in the foregoing Example No. 15.

EXAMPLE NO. 17

In place of the aqueous solution of magnesium silicofluoride set forth in Example No. 15, I may employ a dilute aqueous solution of hydrochloric acid, according to the same procedure set forth in Example No. 15. For this purpose I have found that a one percent aqueous solution of hydrochloric acid is satisfactory.

In this instance, moreover, I may employ fourteen (14) oz. of so-called grade No. 3 vermiculite and two (2) oz. of so-called grade No. 7DO4 asbestos in preparing an acoustical tile having the dimensions specified in Example No. 15.

EXAMPLE NO. 18

In place of the materials specified in the foregoing Example No. 6, but following the same procedure therein set forth, and in Example No. 1, I may employ with defiberized asbestos fiber six (6) oz. of perlite known as "concrete aggregate" weighing approximately eight and one-half (8½) pounds per cubic foot and produced from perlite ore found in Florence, Colorado (Great Lakes Carbon Corporation) and five (5) oz. of plaster grade aggregate weighing seven and one-fourth (7¼) pounds per cubic foot produced from the same ore.

The "concrete aggregate" weighing eight and one-half (8½) pounds per cubic foot has the following screen analysis:

| Mesh size | 16 | 30 | 50 | 100 | Pan |
|---|---|---|---|---|---|
| Cumulative percentage of particles retained on screen, by volume | 20 | 70 | 92 | 97 | 100 |

The plaster grade aggregate weighing seven and one-fourth (7¼) pounds per cubic foot has the following screen analysis:

| Mesh size | 16 | 30 | 50 | 100 | Pan |
|---|---|---|---|---|---|
| Cumulative percentage of particles retained on screen, by volume | 9 | 57 | 85 | 95 | 100 |

EXAMPLE NO. 19

In making the new acoustical tile, employing a mixture of expanded perlite, I may follow the procedure set forth in the foregoing Example No. 15, as in Example No. 18, but employing a mixture of nine (9) oz. of "concrete aggregate" weighing eight and one-half (8½) pounds per cubic foot with a particle size as set forth in Example No. 18, and three (3) oz. of plaster grade aggregate weighing seven and one-fourth (7¼) pounds per cubic foot, and having a mesh size as set forth in Example No. 18 above.

In the above case of acoustical tile made in accordance with the foregoing Examples Nos. 15 and 18, an acoustic tube test by the above-identified laboratory on two specimens of the corresponding acoustical tile gave a noise reduction coefficient at 250 cycles of 0.27 and of 0.76 at 500 cycles with the material abutted tightly against a steel plate, and with no intervening air space.

In the case of the acoustical tile made in accordance with the foregoing Examples Nos. 15 and 19, an acoustic tube test by the same laboratory on two specimens of the corresponding acoustical tile gave a noise reduction coefficient of 0.28 at 250 cycles and of 0.66 at 500 cycles, also with the material abutted directly against a steel plate and with no intervening space.

I have further found that the acoustical properties and overall structural characteristics of the tile can be enhanced by following the gentle mixing procedure outlined in Example 20 to immediately follow. Example 20 will include incidental reference to the nature of purchased items and equipment used in order that there can be an exacting appreciation of the entailed method and mixing procedure.

EXAMPLE 20

The original mixture is composed of Schundler PA4 perlite expanded to produce a weight of 6 to 6½ lbs. per cubic foot, and asbestos fiber designated by Johns-Manville as 7DO4. This mixture of perlite and asbestos may be varied with the view of changing the overall sound control characteristics of the final product. Thus, the variation may be such as 12 ounces of perlite and 2 ounces of asbestos fiber, or the variation may be of a perlite having a variance of screen analysis and in this case either more or less perlite may be used or more or less asbestos fiber may be used, but the foregoing procedure represents an acceptable standard.

The asbestos fiber is received from the producing mill either in burlap bags or compacted in paper bags weighing 100 lbs. The fiber, when received, is in partially compacted state, and as a result when dropped from the container on the floor and in this manner broken up, there will be many small balls of fiber ranging in diameter of from a quarter of an inch up to as much as one inch. It is necessary that this fiber be introduced into the dry mixing process in the present instance in a completely finely divided form. Therefore, the fiber is placed in a gyro screen having a mesh opening of ⅜ of an inch. The violent action of this gyro screen causes the fiber to separate which is dropped into a bin in this separated form. It is important that this asbestos fiber not be picked up by hand nor stepped on nor in any way compressed, because it would then go back into a mass that would not permit a proper distribution of the individual fibers in the dry mixing apparatus.

Thus, the now finely divided asbestos fiber particles are picked up in a metal scoop, weighed and transferred to the dry mixer that has already been charged with 33 lbs. of dried perlite. The asbestos fiber, i.e. 9 lbs. of asbestos fiber thus resulting in a total charge of 42 lbs., is placed on top of the perlite in its finely divided form. Since the asbestos is heavier than the perlite particles, it is introduced on top of the perlite in the mixer so that during the mixing process it will gradually work its way through the entire mass, and individual particles of asbestos become attached to the perlite glass envelope particles either through a mechanical attachment or through a phenomenon of electro-attraction, as explained above and depicted in FIG. 10.

Mixing is gently conducted continuously for a period of two minutes in which time the finely divided particles are completely and properly dispersed and in part temporarily joined together as aggregate asbestos-perlite bodies. If the asbestos fibers were introduced as not properly separated by the gyro screen, then in the finished product small lumps would appear on the surface thus detracting from a desirable appearance and acoustical value.

The two minute mixing process is more or less critical, because were there to be over-mixing the small perlite glass envelopes would likely be unduly fractured thus destroying the desired acoustic nature of the perlite in spite of the asbestos protection sufficient during the critical period. Therefore, great care must be used so as to not exceed the critical mixing period. This is easily accomplished by controlling the mixer with a time switch which automatically stops the mixing at this point. Details of entailed equipment are shown commencing with FIG. 11 and will be explained under the separate heading "Plant Operation" below.

This asbestos-perlite aggregate body mix is now to be thoroughly water-proofed and in part the asbestos fibers permanently bound to the perlite glass envelopes, so that when the final binder is subsequently mixed in, the final binder will not penetrate the asbestos fibers or mineral particles, but will form a matrix to contain them, and so that there will be no further fracturing of the perlite envelopes.

This is accomplished by now introducing one pint of a water-proofing binder solution composed of one-half pint of Dow-Corning XS-1 and/or XS-2 silicone resin mixed with one quart of water. In order to accomplish this, the mixer is equipped with a one quart tank which in turn is connected with a large mixing tank where this solution, through the use of an air motor attached to a shaft with four-bucketed propellers properly arranged thereon, is kept in constant agitation and also under pressure. The operator at the mixing machine turns the valve and fills the container attached to the mixer with one pint of this solution. He then opens another valve, and the solution runs by gravity into a mixing valve where air is introduced, and the solution then in the form of a finely divided spray is sprayed into the mixer in motion containing the aggregate bodies. It requires 35 seconds to properly introduce this pint of material in its finely divided form resulting in the covering of every fiber and particle in the mixture, thus providing a bond between the asbestos fibers and the perlite and the entire mixture becoming highly non-hygroscopic.

The material is now wet to the extent that the major portion of the pint of aqueous solution has been introduced. Therefore, in order to set the silicone binder and develop a permanent bond, it must be thoroughly dried. In order to accomplish this drying, two infra-red gold reflector 4-rod quartz lamps backed up with gold reflectors are attached to the mixer. These lamps are controlled by the time switches. Each quartz lamp is composed of a rod 16 inches long having a capacity of 100 watts per inch. Thus eight of these quartz lamps when activated would produce a little over twelve kilowatts.

Were this mixture to be put into continuous motion during the drying process, here again the perlite glass envelopes would tend to be broken up and the acoustics in the end product destroyed. In order to guard against this, the time switch means for controlling the mixer is selected to operate as follows: for ten minutes the quartz lamps are on, at the end of each minute, the mixture is activated for only one second and then stopped, gently turning over the mass in the mixer and permitting it to be exposed to the infra-red lamps. This operation continues for a period of ten minutes, and the mass in the mixer has been in action during this time for a period of only ten seconds, i.e. one second at the end of each minute.

The mass of aggregate asbestos-perlite bodies has now been treated with the organic silicone and dried and is now ready to be discharged from the mixer. Thus, this mixer is located above the mixer where the final binder solution of sodium silicate and urea is introduced. Transfer and discharge takes place through a gate automatically operated with an air cylinder and air valve and the transfer is to the wet mixer. The discharge period is approximately twenty seconds.

The permanently bonded bodies are now in the wet mixer. This mixer, insofar as the mixing action is concerned, is designed exactly as the dry mixer described above. However, this mixer is equipped with a fifteen gallon tank having a 2½ inch valve with a 2½ inch pipe two feet long attached to the bottom thereof and leading down into the wet mixer through a cover. This pipe is swaged so as to have a flanged end opening of approximately ¼ of an inch. It should be mentioned that both of the mixers have hinged covers. During the drying process in the dry mixer, its cover remains open so that any moisture or steam may escape during the drying operation.

The tank associated with the wet mixer is equipped with mixing paddles. It will be recalled that the dry mixer was charged with a combination of asbestos and perlite having a total weight of approximately 42 lbs. Accordingly, the tank associated with the wet mixer is to be filled with approximately 72 lbs. of 40° to 41° Baumé sodium silicate.

Were the sodium silicate to be introduced as plain sodium silicate, the resulting product when dried out would be highly hygroscopic and not as capable of retaining its original dimensions. If submerged in water, it will break up. Hence, if placed on a ceiling and the relative humidity in the room was normal or above normal it would probably undergo dimensional change; were the four corners securely attached, it would droop into a cup formation. Obviously, under these conditions commercial values are not as good as otherwise.

Therefore, in order to eliminate this condition, the following urea solution is added to the sodium silicate aqueous solution, namely, two ounces of urea, preferably as an equal mixture of urea prells and urea powders, to one pint of water. It is important that this urea solution be prepared in a fifty gallon tank and kept constantly under agitation with an air motor having attached thereto bucket propellers operating at a slow speed. Otherwise, the urea will separate out of solution very rapidly unless agitation is constant. The amount of this solution introduced into the sodium silicate is highly critical. Were there to be too much, there would be an eventual excessive gas (probably ammonia) evolution causing distortions or eruptions in the tile product in the form of lumps over the surface of the dry tile, thus detracting from appearance and resulting in an indeterminate density in the end acoustic product. Likewise, if the urea solution is not properly dispersed through the sodium silicate, this same situation where the urea solution was concentrated would again through the action of evolved gasses cause bumps or bubbles to occur over the surface of the resulting dry acoustical tile. Therefore, when the urea solution as above described has been introduced into the sodium silicate, the sodium silicate and the urea solution must be subjected to violent agitation in the mixing tank by rapidly turning in one direction and then the other the mixing paddles or propellers.

Because of the critical characteristics of this operation, it is highly advantageous that the urea solution and the sodium silicate solution be mixed in reasonably small batches so that absolute control both as applied to quantity and mixing action may be obtained.

With the urea and sodium silicate now combined and with the dry material now reposing in the wet mixing unit, the 2½ inch valve, which is a slip valve, is opened simultaneously with the activation of the mixer and discharge of the binder solution into the wet mixer is commenced. The discharge time is approximately twenty-five seconds. The total mixing time, including the discharge time, is one minute thirty seconds to one minute and forty-five seconds, accurately controlled again through the use of time switches. It is important to avoid excessive mixing to assure as little breakage as possible of the fragile perlite envelopes.

The primary advantage of the perlite or vermiculite particles is that these materials, especially in expanded form, represent minute hollow particles presenting communicating air spaces which contribute to or result in good acoustical, that is, sound absorbing properties. The acoustical properties are further enhanced by using one or both of these materials in combination with asbestos, and in this connection it will be recalled that by first coating the mixed materials including asbestos with a silicone resin or like compatible water-repellent binder adhesive the asbestos fibers build up around the perlite or vermiculite particles and protect these against crushing during subsequent mixing and molding. This condition is illustrated in FIG. 10 of the drawings. In this figure, the reference character P indicates the perlite or vermiculite particles, and the reference character A identifies the asbestos fibers. Thus the asbestos fibers are occluded in a pile array about the tender vermiculite or perlite particles P, and this becomes a permanent union in the presence of the dried silicone resin binder or like water-repellent coating material. The presence of the pile array represented by the asbestos fibers A thus presents in effect an outer shield that protects as many of the particles P as happen to be present in a bundle or agglomerate body, and hence the likelihood of crushing or fracturing the particles P is greatly reduced so that in the final product the original form of the particles P is for the most part maintained, and additionally the pile array preserves some spacing between adjacent agglomerate bodies, such agglomerate body being indicated as a totality by the reference character AG in FIG. 10.

I have further found, however, that acoustical tile acceptable for installations where the sound to be absorbed is not so severe, can be provided by omitting the asbestos so long as the perlite or vermiculite particles are first mixed in the presence of a silicone resin or like substantially water-repellent fire-resistant binder adhesive. Thus, it so happens that by following such procedure wherein the asbestos fibers are omitted, the perlite or vermiculite particles collect together and ball-up into small aggregate bodies containing many of the individual perlite or vermiculite particles bonded together into the lump aggregates by the silicone resin or like binder adhesive which becomes an internal binder. Hence, when these aggregate bodies are further mixed in the presence of the fire-resistant final or external binder as represented by sodium silicate or the like, which is preferably highly water-repellent, those particles within the center of the aggregate bodies are protected against crushing or break-up by the outermost skin or shell of perlite or vermiculite particles. The nature of the aggregate bodies not including asbestos fibers is illustrated in FIG. 10A. In this instance, the aggregate bodies AG′ comprise individual particles P′ of perlite or vermiculite bonded together by the silicone resin binder SB. This is the state of the material as it is passed into the wet mixer where the sodium silicate binder is to be applied. This same protection is afforded during the final molding under pressure. The following is an example of acoustical tile produced by omitting asbestos in accordance with the foregoing:

EXAMPLE 21

The general procedure set forth in connection with Example 20 is followed, except that for each 12 x 12 x ⅞″ tile there is used twelve ounces of Schundler PA4 expanded perlite weighing 6 to 6½ pounds per cubic foot, and no asbestos is mixed therewith. Rather, the initially dry mass charged into the mixer consists only of the required amount of such perlite predetermined as a proper batch for producing a predetermined number of acoustical tiles, and after the mixer has been so charged the water-repellent binder material consisting of a water dispersion of the silicone resin set forth under Example 20 is introduced gradually into the mixer and the mass agitated lightly to disperse the binder uniformly among the perlite particles. This causes the perlite particles to collect together into aggregate bodies until the resin is completely absorbed. The binder is then set up and throughly dried under infra-red heat in the manner explained in connection with Example 20 under circumstances of gentle turn-over of the aggregate bodies containing the binder to further assure as little fracture as possible of the perlite particles.

The mass is then transferred to the wet mixer where the final sodium silicate water solution containing urea is introduced in accordance with the procedure of Example 20, and it was explained that the urea for some reason or other greatly enhances the dimensional stability of the final product by somehow rendering the sodium silicate more resistant to moisture absorption. It has also been found that tile can be produced in accordance with the present invention having even higher resistance to water or moisture absorption by mixing a silico-fluoride directly with the urea fortified sodium silicate solution. The following are examples:

EXAMPLE 22

The same procedure as in Example 21 is followed except that the final or external binder is one composed in the following manner and proportions: a solution of two ounces of urea prells and one-quarter ounce of magnesium silico-fluoride in one pint of water, and three-fourths (¾) ounces of this solution is added to twenty ounces of 41° Baumé sodium silicate. This solution, by increasing the amount of sodium silicate can also be used for tiles that are to include asbestos, as set forth in the following example:

EXAMPLE 23

The general procedure of Example 21 is followed except that eleven ounces of the perlite are mixed with two to three ounces of asbestos fibers before the silicone resin internal binder is added. Use of this binder also results in aggregate bodies of perlite particles as explained above in connection with Example 21, and these bodies are further protected against crushing of the perlite particles due to the tendency of the asbestos fibers to occlude to the outer surfaces of the aggregate perlite bodies providing a protective outer pile, and this condition is permanently maintained by the silicone adhesive dried under heat. In affording the final sodium silicate binder, there is used the same general binder set forth above in the immediately preceding example except that two ounces of urea and one-quarter ounce of magnesium silico-fluoride were mixed in one pint of water and one ounce of this solution was added to 26 to 28 ounces of 41° Baumé sodium silicate.

It is believed that the advantageous effect of urea on the sodium silicate is one deriving from its pH characteristics in disassociation, that is, urea when heated disassociates releasing ammonia which produces a chemically basic condition within the body of the moist tile undergoing drying, thereby contributing to the achievement of a highly effective binding action of the binder derived from sodium silicate. The final binder very probably is a complex of silica. I have found that there are substitutes for urea, but with possibly one exception, namely, diethanolamine, these are not as efficacious as urea. Moreover, urea is a relatively inexpensive material and one that is readily available on the market. Thus, I have found that a solution of urea can be substituted by solutions of other basic ingredients including inorganics such as magnesia (MgO), calcium hydroxide and sodium monohydrogen sulfate ($Na_2HPO_4 \cdot 10H_2O$) and organic bases including pyridine, triethanolamine, ethanolamine and diethanolamine. These substitutes probably produce a strong basic condition within the tile immediately upon addition, in contrast to urea. All of these materials are less basic than sodium silicate, having a pH value of about 7 or better. In testing these materials capable of substitution for urea, one ounce thereof was dissolved in one pint of water just as one ounce of urea was dissolved in one pint of water as the preferred urea concentration in the corresponding examples described above.

The resultant solutions were individually used in substitution of the urea solution in corresponding individual test tiles composed essentially of perlite mineral particles that were first coated with a silicone resin binder followed by sodium silicate modified by the particular urea substitue. After the test tile bodies had been made up, each was submerged in water at room temperature and loaded at the center with a five-ounce dead weight. The time at which each tile broke under the weight was noted, and the following data tabulated:

| Test body No. | Elapsed time until breaking, days | pH |
|---|---|---|
| 11. Calcium hydroxide (from lime) | 9 | 12.4 |
| 5. Pyridine | 9 | 9.7 |
| 10. Sodium monohydrogen sulfate | 10 | 9.6 |
| 6. Piperidine | 10 | 12.7 |
| 7. Triethanolamine | 10 | 10.8 |
| 1. Ethanolamine | 19 | 11.9 |
| 8. Magnesia | 19 | 10.5 |
| 2. Diethanolamine | 26 | 11.5 |
| 9. Urea | 26+ | 7.2 |

PLANT OPERATION

FIGS. 11 to 20 inclusive are devoted to a showing of essential production equipment used to manufacture acoustical tile in accordance with the present invention, as well as certain details of the finished product. These figures are not drawn to scale and are more or less schematic in most respects. Referring to FIG. 11, the needed weight ratios of the dry ingredients which will consist of the perlite or vermiculite particles and the asbestos fibers, if the latter are to be used, are charged as gently as possible into a mixer 100 which is equipped with mixer blades (not shown) that are rotated by a propeller shaft 111 which in turn can be considered as driven by a belt and pulley connection driven by a drive motor DM. Where asbestos fibers are to be used, these, being heavier than perlite or vermiculite, are added to the dry mixer after perlite or vermiculite. Being heavier, the asbestos will gradually work its way down through the perlite or vermiculite during preliminary mixing which occurs uninterruptedly for only two minutes in order that the perlite or vermiculite envelope-type particles will not be unduly broken or crushed one on another.

It will be recalled that the dry ingredients charged into the dry mixer 100 are to be lightly or tenderly agitated in the presence of a fire-resistant water-repellent adhesive or binder represented by a silicone resin or the like as explained above, and which occurs as a coating entirely about the particles assuring complete water repellency. This binder adhesive can be advantageously supplied from a container 112 mounted adjacent the dry mixer 100, suitable spouting and valving means being afforded to enable the binder resin to be sprayed in mist form into the mixer 100 in the desired amount and at the desired rate which consumes less than one minute. In order that gentle mixing and turn-over of the ingredients can be accomplished in the dry mixer 100, this mixer is equipped with a control box CB which includes a known kind of selectively settable timing means for periodically energizing the drive motor DM. It should be pointed out that the top of the dry mixer 100 is equipped with a lid (not shown) and the lid is equipped with heater elements 115 which comprise infra-red quartz lamps, and associated reflectors, which are energized after the resin binder has been uniformly dispersed among the dry ingredients charged into the dry mixer 100, and upon energization the heater elements remove water and cause the binder resin to set up and harden producing a permanent inner coating about the perlite or vermiculite particles. These lamps are turned on for ten minutes, assuming a dry charge of 33 pounds of perlite and 9 pounds of asbestos, and a charge of one pint of water-dispersed silicone resins. During the time the lamps are one, the agitator in the dry mixer is automatically operated for but one second only every one minute. In the presence of asbestos, the asbestos fibers are at the same time permanently affixed by the silicone binder to the mineral particles in a protective pile array; or in the absence of asbestos fibers, the mineral particles represented by perlite or vermiculite are themselves agglomerated into larger size particles wherein the innermost particles in each agglomerate bundle of particles are protected by the shell of outermost particles, and this of course occurs to a certain extent even where the asbestos fibers are present.

After the foregoing has been accomplished, a gate in the mixer 100 is opened and the bonded dry bodies are discharged through a funnel 120 into the so-called wet mixer 121, and it is here that the final binder, in the form of sodium silicate or like siliceous water-soluble fire-resistant binder adhesive is added. The structural details of the wet mixer are similar to those of the dry mixer in that the mass in the wet mixer is to be turned over by agitating blades that are operated periodically in a brief, gentle manner by a drive motor DM2 controlled by timing elements in a control panel CB2.

The sodium silicate or like binder is admitted from a tank 123 that is mounted on the wet mixer, and materials such as urea, magnesium silico-fluoride and the like, which are used to modify and enhance the effect of the sodium silicate, are mixed with the latter in the tank 123 for simultaneous admission with the sodium silicate into the wet mixer. For the charge mentioned above, approximately 72 pounds of 40–41° Baumé sodium silicate is used, and this advantageously modified with urea, and magnesium silico-fluoride. The wet mixer 121 is not equipped with heater elements 115 of the kind described above, inasmuch as the silicate binder is dried out and permanently set up in heat chambers to be described hereinafter.

The time required to introduce the material from the tank 123 is about 25 seconds, and the total mixing time in the wet mixer inclusive of this is about one and one-half minutes for the above-identified charge as set by timing switches again to assure no more mixing than the minimum necessary.

Once the materials in the wet mixer have been mixed to the desired extent, the discharge gate of the wet mixer is opened and the moist mass from which the acoustic tile are to be made is discharged through a funnel onto the lower end of an inclined conveyor belt 126 which carries the moist mass to a filling station where individual acoustical tile molds are to be filled therewith as will be explained.

The plant installation in the present instance is preferably set up so that advantage is taken of gravity flow for charging and discharging the mixers 100 and 121. Such installation eliminates the need for intermediate feed conveyors into and out of the mixers, and conserves a great deal on the square footage of the plant structure. In other words, the dry mixer 100 is located at an elevated position immediately above the wet mixer 121, and the wet mixer 121 in turn is located at an elevated position slightly above the lower end of the conveyor belt 126. Thus as shown in FIG. 11, the conveyor belt 126 moves in an upward direction proceeding forwardly from the wet mixer 121, and the endless conveyor 126 reverses at a point elevated somewhat above a table 130 which represents the location of the filling station. This table 130 is located approximately at what is considered normal table height for an individual, since individual workers are employed for filling the acoustical tile molds.

The tile molds consist essentially of two main parts, namely, a mold tray 132, FIGS. 12, 13 and 14 and a stripper pallet in the form of a screen or perforate plate 133, FIGS. 12 and 15. The stripper screen serves three main purposes. First of all, it enables the tile, after the same have been densified in a manner to be explained, to be easily removed from the mold trays 132, and at the same time thereby supported during the drying operation. Secondly, the stripper screens are configured in such a manner as to cooperate with a complemental configuration at the bottom of the mold trays which accounts for a highly advantageous density variation in the tile. Third, the stripper screen 133 enables the tile product when supported thereby in an oven to be uniformly heated and baked.

The mold tray 132 is of course of rectangular dimension and has four vertical side walls 132S, FIG. 12, which have a vertical dimension (1⅝″) predetermined as adequate to define a mold cavity into which will be deposited a quantity of the moist mix relayed to the filling station by the conveyor belt 126. Of course the top of each mold tray 132 is open to enable the filling operation to be performed, and the bottom of the mold tray is defined by a plurality of spaced bars 136 and 137, the spaces between the bars being exposed at the bottom of the mold tray, which is to say that in appearance the bottom of the mold tray as shown in FIGS. 12 and 13 is in the nature of a grid. The bars 136 and 137 are rigidly joined to two opposed side walls of the mold tray by necked-down ties 136T and 137T, respectively, and are joined to one another at the midpoint of the tray bottom by like necked-down intermediate ties T. As shown in FIG. 12, the ties T and the ties 136T and 137T are rectangular in cross section as are the bars 136 and 137, and the flat top surfaces of the ties are located below the top surfaces of the bars so that there are in effect three cross channels at the bottom of the mold tray. The ends of the bars 136 and 137 adjacent the side walls of the tray 132 are depressed at 138 and 139, FIGS. 12, 13, and 14, just prior to merging into the ties 136T and 137T.

Each stripper screen 133, FIG. 15, is so shaped as to have a pair of side cross bars 140 and 141 along two side margins which will fit into the corresponding two channels defined by the necked-down ties 136T and 137T leaving exposed the depressions 138 and 139 as shown in FIG. 12. The screen 133 has an intermediate cross bar 142 which will fit in the channel defined by the aligned and similarly dimensioned ties T in the mold pan. The screen 133 also includes spaced transverse bars 145 and 146 which will fit in the spaces between the bars 136 and 137, and the screen also includes a pair of end bars 148 and 149 which are joined at their ends to the ends of the side bars 140 and 141 to complete a closed bar rectangle defining the periphery of each screen 133. All of the bars comprising the screen are of the same cross-section dimension. It should finally be pointed out that each screen 133 is thin in comparison to the bars 136 and 137 of the mold tray. Consequently, when a screen is properly fitted in a mold tray or pan 132, the top surfaces of the bars 136 and 137 project above all of the bars of the screen 133 as will be evident in FIG. 12 wherein there is shown at what constitutes a mold loading station a tray and screen assembly ready to move to the filling station. A screen when mounted in its mold tray completely closes all spaces at the bottom of the tray, but the tray bars 136 and 137, projecting above the screen bars, account for a variable density in and a rib effect at the back of the tile as will be explained.

It was mentioned that the filling station is generally defined as to location by a table 130 and that the moist mix carried by the conveyor belt 126 is dropped in piles on to the table 130. Such occurs at the left hand side of the table 130 as viewed in FIG. 11. A mold and screen assembly is illustrated in FIG. 11 as located accurately in alignment with a rectangular opening in the table 130. The tray or pans 132 are carried by an endless conveyor 150 represented by pairs of endless chains driven by sprockets 151, FIG. 11, and 152, FIG. 16. There are thus two runs or passes of the conveyor 150, namely, an upper pass to the right as viewed in FIG. 11 which moves the assembled pans and screens along the production line, and a lower pass to the left where empty mold pans 132 are inverted. As the empty pans 132 travel to the left, FIG. 11, the sprockets 151 reverse their direction of travel, and a pan at the sprockets 151 is gradually moved from an inverted or upside-down position into an upright position adjacent a roller conveyor 155 where clean screens are available as shown in FIG. 12. This is the mold loading station. There is a worker here who removes a clean screen from the conveyor 155 and deposits this screen properly in the bottom of the mold tray 132. This tray and screen assembly is moved by the conveyor 150 to the filling station beneath the table top 130.

When this assembly is properly registered with the filling opening in the table 130, approximately half the amount of the moist mix to be eventually pressed is deposited in the open mold cavity. This rather loose and uncompacted quantity mix fills the mold cavity, whereupon a compacter head 156 is pulled down manually by handles 157 to compress the mass that was scraped into the open mold cavity. The compacter head 156 is of rectangular shape to move neatly into the mold cavity, and as shown in FIG. 11 the compacter head has bars 156B arranged in grid form complemental to the construction of the assembled mold at the filling station. Hence, the moist mass has a differential density due to the cooperating bars 156 and 136–7, FIG. 11A. Downward movement of the compacter head occurs against the resistance of a coil spring 160. Thus, the compacter head 156 is supported by a shaft 161 which is guided by a fixed sleeve 162, the latter being supported in a fixed position by support arms 164. The shaft 161 is provided at its upper end with a cross head 165 fixed thereto, and it is the cross head 165 which compresses the spring 160 as an incident to a downward pull on the compacter head 156. When the compacter head is released after lightly compacting the material in the mold, the spring 160 accounts for a return movement of the compacter head to its normal elevated or released position illustrated in FIG. 11.

After the wet mass first added to the mold cavity has been partially densified by the compacter head 156 to the state X, FIG. 11A, the remaining amount of the moist mass Y, FIG. 11A, which is to compose the particular tile is then deposited in the mold cavity to fill the same, the top of the mass is leveled off level with the table top 130 and the conveyor 150 is activated to move the filled tray toward the final pressing station where a ram, as will now be explained, is effective to press the material in the mold to its final thickness dimension.

It should here be pointed out that foot-operated control means (not shown) are provided for separately operating a pair of stops 158 and 159 which can be considered as pivoted respectively at 158P and 159P in position to stop one filled tray 132A beneath the ram and another filled tray 132B at a point intermediate the ram and the filling station. The trays are fixed to the conveyor 150 in a spaced relation that is determined by the spacing between the several stations along the length of the conveyor chain 150, and hence when a stop is down the conveyor 150 is stopped. In this connection it should be mentioned the sprockets 151 and 152 are driven by a motor (not shown) that includes a slip-clutch coupling to the drive shaft for the sprockets 151 and 152.

The stops 158 and 159 can be considered as under control of operating links 158L and 159L, FIG. 11, and these links in turn are part of the aforesaid control that preferably is supervised manually by the workers at the filling station and the ram station. Thus, stop 159 should not be released until after the ram is effective in a manner to be explained, and stop 158 should not be released until after a mold has been filled and finally leveled at the filling station. Release of both stops is required to enable the conveyor 150 with its trays to move on.

Moreover, means are associated with the table 130 to raise and lower the table, and while such means can take many different forms this can be considered as accomplished by toggle link structure L, FIG. 11, which responds to the action of the stop block control link 158L. In other words, the connections including the links L are selected as a known mechanical linkage which need not here be illustrated and which will cause the table top 130 to be lowered to the top plane of a mold tray 152 at the filling station, so that the material in the mold can be accurately and easily leveled off at the time when the stop 158 is down in blocking position, and which will allow the table top 130 to be raised enabling the filled mold to easily pass therebelow and a new mold to move into filling position when the stop 158 is up in a released position.

Thus, as will be observed in FIG. 11, a ram head 165 is located to the right of the filling station, and this ram head is carried by a piston 166 which is associated with an air cylinder 168. The stop 159 is so located as when lowered to properly position a filled mold assembly at the pressing station directly beneath the ram 165. Hence, when a filled mold 132A is accurately located beneath the ram head 165, air under pressure is furnished to the cylinder 168 whereupon the ram head 165 is lowered and moves with force into the open upper end of the mold tray at the pressing station. In this manner, the material in the mold is compressed to the final desired thickness which in most instances will be ⅞″. This particular dimension is the dimension at the thickest points of the tile. Thus, the area at the bottom of the tile form in the mold where the bars 136 and 137 are located will be less than the ⅞″ dimension, and hence the interior sections of the tile corresponding to the bars 136 and 137 will be more dense than the adjacent sections corresponding to the transverse bars of the screen 133 at the bottom of the mold containing the pressed tile form. This variation in thickness dimension, and consequently density, is shown in FIGS. 19 and 19A. Thus, the face FF of the tile that was engaged by the ram head 165 is smooth since in the present instance no design configuration is used in association with the ram head. The back B of the tile, however, has narrow ribs RB where the tile form was pressed against the bars of the screen 133 and has wider depressed areas DA where the tile form in the mold was pressed against the bars 136 and 137 of the mold tray 132. It should be pointed out that the ram head face is of course oriented in a truly horizontal plane; hence, the face of the ram head will produce an accurately oriented face FF on the tile even though the screen at the bottom of the mold might be slightly warped through over-use or over-heating.

Advantageously the ram is equipped with a removable presser shoe 165P, the lower face of which can be configured to impart to the upper face of the mass in the tray whatever design is desired for the exposed face of the finished tile. By changing the shoe 165P, another design can be employed. Once the ram head has been raised to clear a mold after compaction of the moist mix, a worker wipes the bottom face of the ram head to clean loose material therefrom, or this can be done by an automated wiper arm which is actuated once the ram head is raised.

Referring now to FIG. 16, the conveyor 150 moves the filled molds from the pressing station beneath a belt conveyor 170, the operation of which will be explained below. A stripper station is located on the right-hand side of the belt 170 as viewed in FIG. 16 and it is here that each screen 133 and a pressed tile T supported thereby are removed from the associated mold tray 132. The stripping mechanism comprises pins 172 which are supported by lifter mechanism including a cross plate 175 in turn operated by an air piston and cylinder mechanism 176. The pins 172 are so located as to move upwardly at the bottom four corners of the mold trays 132 so that the upper ends of the stripper pins engage the four corners of the screen 133 within the mold tray. During the stripping operation, the conveyor 150 is of course stationary, and preferably the connections are such that air is furnished to the cylinders for operating the ram head simultaneously with air under pressure being furnished to the stripper cylinder.

Once the tile T and its associated screen 133 have been raised upward out of a mold tray as illustrated in FIG. 16, a worker lifts this stripped assembly off the pins 172 and sets the same on a pair of supporting blocks 180 and 181 which are carried by the conveyor belt 170, and this conveyor belt moves the tile and its supporting screen to a baking oven.

It was mentioned that the air cylinder which controls the ram 165 and the air cylinder which controls the stripper pins 175 operate in unison, that is, when the ram 165 is down to compress, the pins 172 are up to strip. Alternatively, when the presser ram is raised, the stripper pins are lowered. This frees the conveyor 150 for its next movement to advance a new filled mold to the pressing station and to advance a compressed but uncured tile to the stripper station. During this next movement of the conveyor, an emptied mold pan 132 at the stripper station is turned about the sprockets 152, FIG. 16, to partake of the lower run of the conveyor 150, and this empty mold tray is moved gradually step-by-step toward the sprockets 151 at the mold loading station where it will eventually be provided with another screen available from the conveyor 155, FIG. 11. During the course of their return movement from the stripper station to the mold loading station, the mold trays 132 are moved past a mold cleaning station 183, FIG. 16, where spray heads 184 or other fluid cleaning means are effective to remove loose matter from the side walls and bottom bars of the mold trays.

The pressed but unfired tile T removed at the stripper station and carried by the screens 132, which now serve as pallets, are moved by the conveyor 170 toward an unloading table 185, FIG. 17, which is located at the input end of a long heat treating chamber generally indicated at 190 in FIG. 17. Thus, as a leading one of the tiles T approaches the unloading table 185, this tile and four succeeding tiles are removed one by one by a workman at the unloading table 185. In this connection, it was explained above that the drawings illustrating the equipment and process steps are not drawn to scale for the most part, and it should be borne in mind that the long dimension of the table 185 is sufficient to enable at least five of the tile to be set thereon in side by side relation.

When an adequate number of tile have thus been removed from the conveyor 170 and set on the table 185, these are then pushed as a set onto a sprocket driven conveyor 191 which includes widely spaced conveyor bars 191B enabling good heating from the bottom of the tile to be achieved within the heat treating chamber 190. The conveyor 191 moves slowly through the heat treating chamber. This speed in actual practice is approximately two feet per minute, and it should be pointed out that the heat treating chamber alternates between what can be considered hot or active oven banks 192 and interposed unheated or lull chambers 193.

A product of the kind produced under the present invention must be of uniform characteristic throughout and dimensionally stable. The latter characteristic is achieved by the sodium silicate binder modified by urea or the like and which is cured, hardened and set up in the drying chamber 190. Additionally, the open bottom nature of the supporting screens 133 assure that there will be, as a practical consideration, every bit as efficient "firing" or heating of the tile from the bottom as from the top.

The tile is dried in three distinct states while passing through the heat treating chamber. In the first stage, the temperatutre of the tile (throughout its mass) is gradually raised to 210° F. within a period of approximately six minutes. The active ovens 192 are equipped with infrared heaters, and the first stage occurs in bank one B1, FIG. 17, of the infrared drier.

In the second stage, the tile temperature (throughout its mass) is maintained between 190° F. and 210° F. by subjecting the tile to alternate periods of radiant heat and lull periods wherein no direct heat is applied to the tile; each of these periods (heat and lull) being of approximately six minutes duration. Stage two starts in the second infrared bank B2 which is immediately adjacent to bank B1 and progresses through the first lull period as in chamber 193, the third infrared bank B3, the second lull period, the fourth infrared bank, the third lull period, and so on, and ends approximately half way through the fifth infrared bank, corresponding to forty-four minutes of total elapsed time of the drying cycle. The second stage is approximately thirty-eight minutes in duration, and serves to evaporate the free moisture in the tile.

The end of stage two and the start of stage three occurs when the tile temperature begins to go above 210° F. indicating that free water has been removed from the tile, and this takes place in the fifth infrared bank at the forty-four minute point, as mentioned above. The tile temperature reaches 260° F. at the end of the fifth infrared bank and gradually drops to 220° F. during the fourth lull period. The sixth and final infrared bank causes the tile to reach 320° F., and at this point the tile is bone dry or very nearly so. Stage three serves to remove the water of crystalization as required for bone dry condition and also further activates the urea. Total time elapsed for all three stages is approximately 60 minutes.

The infrared oven, or banks as B1, referred to above are so constructed and designed that the tile is subjected to radiant energy on both top and bottom while the tile progresses through the drier on the conveyor 191 in a horizontal plane. The conveyor 191 is designed to offer a minimum of obstruction to the radiant energy by widely spacing the bars 191B, and the radiation is uniformly distributed over the conveyor area and free from hot spots resulting in uniform heating of both sides of the tile. The source of radiant energy is a known standard industrial infrared lamp, employing a 4000° F. tungsten filament.

The intensity of the radiant energy directed at the tile is approximately 500 watts per square foot on each side; i.e., top and bottom. An essential feature of the infrared banks is the use of a gold-plated reflector in conjunction with the lamp. The reflector serves to project the energy uniformly, and since gold has a reflection factor of approximately 98% in the infrared portion of the spectrum, the initial component of radiant energy received by the reflector from the lamp as well as any energy that is reflected by the tile, is reflected and ultimately absorbed by the tile.

Another essential feature of the drier is the method of ventilation. Room temperature air is used to cool the lamp bases and reflectors. This is accomplished without disturbing the air in the heated area by means of double wall construction, whereby a separate chamber exists for cooling the lamps and reflectors. Thus, the lamps project through openings in a separate wall spaced above the tile. This wall is otherwise sealed off to afford a cooling chamber for the lamp equipment and reflector backs. This room air is passed over the lamp bases and reflector backs and is heated to approximately 160° F. and is then directed over the tiles passing through the radiant zone. The preheated air serves to carry off the moisture released from the tile only and does not contribute to the heating effect, inasmuch as the air temperature or ambient in the oven is lower than the tile temperature. However, by being preheated, the cooling effect of the air passing over the tile is minimized. The distribution of this air is uniform over the width of the conveyor 191 both top and bottom, so all tiles and on both sides experience the same condition.

The moisture laden air is forced out beyond the infrared banks into the lull or unheated areas 193 mentioned above and is carried off therein by means of exhaust ducts 195 and fans. The lull areas are essentially enclosed areas so constructed that the tile is not subjected to "cold" room air but within a confined enclosure with the aforementioned controlled hot air movement.

Just before emerging from the last of chambers at the drying station, each set of tile may be subjected to a highly atomized cold water spray to induce breaking the seal between each tile and its pallet screen facilitating eventual separation of a tile from its pallet screen.

The completely cured acoustic tile emerge at the output end of the heat treating chamber generally defined by a downwardly sloped unloading tray 197. As a series of five tile emerge from the output end of the heat treating chamber, a periodically reciprocating spray head 198 is effective in one pass over the row of tile to spray the upwardly disposed faces of the five tile with a pigment coating in most instances will be an off-white. The spray head 198 is of a known kind and is schematically illustrated in FIG. 17. This spray head is carried by a sprocket driven chain 199. The motor for driving the drive sprocket is indicated at DM in FIG. 17, and it should be explained that the operation of this motor is timed by a timing switch TS which in turn is controlled by a multi-lobed cam C, FIG. 17, which rotates with one of the sprockets which is used to drive the conveyor 191 at its slow speed mentioned above. This cam is associated with the switch TS in such a manner that as each lobe on the cam passes the switch the latter is actuated to energize the motor which drives the chain 199 which carries the spray head 198. Limit switches (not shown) are located in position to be actuated by the spray head as it reaches its end position after one pass over a set of tile, and when a limit switch is actuated at the end of travel of the spray head, circuit to the drive motor for the chain 199 is interrupted, breaking the drive to the chain 199. Mechanical means (not shown) are effected at the end of one pass of the spray head to uncouple the spray head from the run of the chain 199 which carries the spray head to its end position and effective at the same time to couple the spray head to the other run of the chain. Thus, assuming the chain 199 to be driven clockwise as viewed in FIG. 17, the lower run of the chain, when coupled to the spray head, will carry the spray head away from the observer while the upper run of the chain, when coupled to the spray head, will carry the latter toward the observer. These two passes account for the spraying of ten tile, that is a first row of five tile emerging from the heat treating chamber, and then a second row next emerging from the heat treating chamber. This of course is repeated as long as there are tile emerging from the heat treating chamber, all passes of the spray head occurring at intervals timed by the cam C which of course is configured to cause actuation of the timing switch TS as each set of tile reaches position beneath the spray head 198.

As the tile and their supporting pallets 132 reach the top edge of the inclined plate 197, the pallet screens which carry the tile slide down the plate 197 and on to the rollers of an inclined roller-type conveyor 200. Workmen at this point remove from the screens the individual tile and stack the same on a receiving table 201, although such removal can be performed automatically if desired by vacuum cups on a lifter head. The empty screens are then pushed along the conveyor 200 and travel down an inclined section 202 into and through a cooling chamber 205 which communicates with a stack 206 which in turn is provided with a draft fan which causes a cooling draft to be created within the cooling chamber 205 enabling the individual screens moving through the cooling chamber 205 to be cooled down.

As the cooled screens 132 emerge from the cooling chamber 205, these are picked up by a driven chain (not shown) disposed within the roller conveyor 200, and this chain is effective to move each of the screens first beneath a rotating wire brush 210 which is effective to scrape tile flecks or residue from the screens. The chain operating in the trough of the roller conveyor 200 is next effective to advance the screens beneath a cleaning roller 212 which wipes the tops of the screens 132 with a cleaning solvent and a releasing agent, and the screens then move back to the mold loading station along the conveyor 155. It should here be mentioned that advantageously the spray head for the mold trays is adopted to spray a release agent and that when the bottom face of the ram head is wiped clean it is also to be wiped with a release agent.

Referring to FIGS. 18 and 19, there is illustrated, respectively, the front face FF and back B of an acoustical tile as it emerges from the heat treating chamber. The face FF is the one that will be exposed when installed as an aspect of interior decoration, and unevenness of the back of the tile is of minor concern. In most instances, the face FF will be flat and uniform, but if desired this face can be a design imparted thereto by appropriate substitution of a design plate on the ram head. The back of the tile as shown in FIG. 19 is extensively ribbed. Thus, the back B of the tile has a raised rib R which is of uniform dimension about the entire periphery of the back of the tile, and this rib R corresponds substantially to the extents of the side end and bars 140—141—148—149 of the screen in the mold. The back of the tile has a center rib RC which corresponds to the transverse bar 142 of the screen which, as mentioned above, fits in the channel in the bottom of the mold tray defined by the ties T, the top plane of the bar 142 lying below the upper faces of the bars 136 and 137 at the bottom of the mold tray. The back of the tile also has parallel raised ribs RB separated by depressions D, and these depressions D are the result of the mold tray bars 136 and 137 projecting above the bars 145 and 146 of the screen as clearly shown in FIG. 15.

To facilitate installation, the tile are next moved to what can be considered a milling station where the edges of the tile are kerfed and backcut. Additionally, the tile may be trimmed by abrading discs or wheels operative on the upper faces of the tiles. The essential elements of the milling station are diagrammed in FIG. 20. Thus, the milling station includes two feed belts 210 and 212 arranged at right angles one relative to another. To facilitate an understanding of the sequence of the operations at the milling station, six tile T0 to T5 are illustrated in FIG. 20 in various stages insofar as the operations performed thereon are concerned. The tile T0 represents a completely finished tile ready to be packaged and shipped to the customer, whereas tile T5 represents a tile as it was received from the firing chamber. The first operations on the tile at the milling station are performed on the tile carried by the belt 210, and lugs or bars (not shown) are mounted on the belt 210 to carry the tile along toward the observer as viewed in FIG. 20. Moreover, the tile are firmly held down on the upper base of the belt 210 by resilient rollers (not shown). The first operation performed at the milling station is to kerf two side edges of a tile as T5, and this operation is performed by a pair of kerfing cutters 214 and 215 that are located at opposite sides of the belt 210 in position to cut into the left and right hand sides of the tile T5 as viewed in FIG. 20. Thus, as the belt 210 is effective to advance the tile T5 past the kerfing cutters or discs 214 and 215, these cut into the left and right hand side edges of the tile T5 for a predetermined depth, and this produces kerfs or slots KE1 and KE2 which are illustrated in FIG. 20 as provided in the tile T4 which was previously advanced past the kerfing discs 214 and 215. These kerfs or slots are approximately at the center line of the side edges of the tile, and it should be explained that the purpose of the kerfs is to enable T-head supporting elements suspended from a ceiling to have the two cross arms thereof fitted into the kerf slots of a pair of tile to be suspended from the ceiling by the T-heads. Such a mode of suspension is illustrated in FIG. 21, and in order that the vertical leg TC of the T-head will not prevent close abutting of two adjacent ceiling mounted tile, it is necessary to backcut the edges of the tile as at BC, FIG. 21, and this backcutting will be performed on the tile T4 by a pair of milling discs 220 and 221. Two backcuts BC1 and BC2 are illustrated in FIG. 20 as having been performed on the tile T3.

To save time in installation, all four edges of a tile are kerfed and backcut, and in pursuance of this, a tile as T3 is removed from the belt 210 and set on the belt 212 without turning the tile. Thus, the tile T2 in FIG. 20 is ready to have its near side and far side as viewed in FIG. 19 kerfed and backcut respectively by kerfing discs 222 and 223 and backcutting on milling discs 225 and 226. These operations are apparent in FIG. 20 wherein it will be observed that the tile T1 has been kerfed at KE3, and there is a like kerf not visible in FIG. 20 on the opposite side of the tile T1 parallel to the kerf slot KE3. Finally, the tile T1 will be backcut by the milling discs 225 and 226 which is the state of the tile at position T0 in FIG. 20.

CONCLUSION

It will be seen from the foregoing that under the present invention there is afforded an acoustical tile composed entirely of non-combustible material and characterized as a tile product that is essentially of mineral or inorganic composition throughout. In composing the tile of the present invention, advantage is taken of mineral particles in the form of perlite or vermiculite having highly advantageous sound-deadening properties in the tile product. In spite of the highly frangible nature of these particles, their original shape and form are maintained by first mixing the same, with or without asbestos, in the presence of a water-repellent, fire-resistant binder material which causes the particles in the first instance to be permanently bonded together in aggregate or compound bodies that are made up of many of the particles. In the presence of asbestos, the asbestos fibers are permanently bonded as a pile array to the outside of the aggregate bodies, thereby protecting the particles against crushing or fracture during subsequent mixing and pressing operations. This also assists in maintaining porosity in the final product.

In the absence of asbestos, the aggregate bodies will have an outer shell of the mineral particles protecting the particles in the aggregate bodies inward of the outer shell, so that again the highly advantageous original shape and form are maintained and porosity in the final product is assured, that is, the final product is less dense and less compacted in contrast to one formed solely of minute broken perlite or vermiculite particles.

Nevertheless, and in all forms of the invention, it may be desirable to account for a differential density in the finished product. Such differential densities are obtained by having resort to spaced bars of different height at the bottom of the mold tray. Moreover, the compacting head at the mold filling station is used to establish differential density as described above.

Removal of the compacted material is facilitated by the gridded tile pallet support which is stripped from the mold tray by the stripping pins at the stripping station. Thus, the initially compacted but uncured tile product is relatively fragile, but in accordance with the present invention this is not touched by hand or handled manually until the finished product emerges from the oven.

It will moreover be recognized that the plant operation is essentially automated. In this connection it may be pointed out that the process drive illustrated in the drawings can take different directions. For example, the intermediate feed belt 170 can be eliminated and stripping can be carried out directly in front of a curing oven and into which each stripped tile and pallet can be directly advanced one by one. The mixers referred to above are of the kind disclosed in my application Ser. No. 691,268, filed October 21, 1957, and now Patent No. 2,901,228, patented August 25, 1959.

The term "perlite" as used hereinbefore and as used hereinafter in the claims, is meant to include and does include both the naturally occurring expanded perlite mineral and artificially expanded perlite, or mixtures of these materials.

The term "asbestos" as used hereinbefore, and as used hereinafter in the claims, is meant not only the serpentine asbestos hereinbefore specified but also amphibole asbestos.

It will be understood that in place of the specific alkali metal silicate named in the foregoing examples, namely, sodium silicate, equivalent alkali metal silicates, such as potassium silicate, may be used, but for economy in use, as well as efficiency, I have found that sodium silicate is well suited for the purpose of the present invention.

It will thus be seen from the foregoing description, considered in conjunction with the accompanying drawings, that the present invention provides a new and improved acoustical tile composition and method for making the same, and that the invention thus has the desirable advantages and characteristics and accomplishes its intended objects including those hereinbefore pointed out and others which are inherent in the invention.

I claim:

1. An acoustical tile comprised of the dried molded tile-shaped produce of an intimate mixture of asbestos base fibers and particles selcted from the group consisting of vermiculite and perlite, which fibers and particles have as inner coated surfaces thereon a fire-resistant water-repellent composition adherent thereto, and which fibers and particles have as the next outer surfaces thereon a fire-resistant binder adherent to and overlying said inner coated surfaces.

2. An acoustical tile comprised of the dried molded tile-shaped product of an intimate mixture of asbestos fibers and particles selected from the group consisting of vermiculite and perlite, which fibers and particles have as inner coated surfaces thereon a fire-resistant water repellent composition in the form of an organic water-soluble silicone resin applied thereto, and which fibers and particles have as the next outer surfaces thereon a fire-resistant binder in the form of sodium silicate adherent to and overlying said inner coated surfaces.

3. An acoustical tile comprised of the dried molded tile-shaped product of an intimate mixture of asbestos fibers and particles selected from the group consisting of vermiculite and perlite, which fibers and particles have as inner coated surfaces thereon a fire-resistant water-repellent composition, and which fibers and particles have as the next outer surfaces thereon a fire-resistant silicate binder adherent to and overlying said inner coated surfaces, said silicate binder being treated with a material selected from the group consisting of hydrochloric acid and water-soluble silico-fluorides.

4. An acoustical tile comprised of the dried molded tile-shaped product of an intimate mixture of asbestos fibers and particles selected from the group consisting of vermiculite and perlite, which fibers and particles have as inner coated surfaces thereon a fire-resistant water-repellent coating composition in the form of salts of organosilanols and organosiloxanols, and which fibers and particles have as the next outer surfaces thereon a fire-resistant binder in the form of sodium silicate adherent to and overlying said inner coated surfaces.

5. An acoustical tile comprised of the dried molded tile-shaped product of an intimate mixture of asbestos fibers and particles selected from the group consisting of vermiculite and perlite, which fibers and particles have as inner coated surfaces thereon a fire-resistant water-repellent composition in the form of derivatives or organosilanols and organosiloxanols, and which fibers and particles have as the next outer surfaces thereon a fire-resistant binder in the form of sodium silicate adherent to and overlying said inner coated surfaces, said silicate binder being treated with a material selected from the group consisting of hydrochloric acid and water-soluble silico-fluorides.

6. An acoustical tile as defined in claim 1 in which the said tile-shaped product is composed of portions of different densities but having the same composition.

7. An acoustical tile as defined in claim 1 in which the said tile-shaped product includes a central portion having a peripheral marginal edge portion extending therearound and of a higher density than the said central portion but having the same composition.

8. An acoustical tile as defined in claim 1 in which the said tile-shaped product has reinforcing members embedded therein and extending therethrough.

9. An acoustical tile as defined in claim 1 in which the said tile-shaped product has a plurality of substantially V-shaped extending reinforcing members embedded therein and extending therethrough.

10. An acoustical tile as defined in claim 1 in which said tile-shaped product has a plurality of groups of substantially V-shaped metallic reinforcing members embedded therein and extending therethrough, and in which each of said groups of reinforcing members includes a plurality of said reinforcing members extending parallel to each other, and in which the said reinforcing members in each of said groups intersect the reinforcing members in the other of said groups at substantially right angles, and in which said groups of reinforcing members are arranged in different but parallel planes in said tile-shaped product.

11. The method of making an acoustical tile which comprises the steps of forming an intimate mixture of asbestos fibers and particles selected from the group consisting of vermiculite and perlite, first thoroughly coating said mixture with a fire-resistant water-repellent coating composition, next thoroughly impregnating said mixture with a fire-resistant silicate binder, placing the mixture thus prepared in a mold and forming it into an acoustical tile shape under pressure, and then drying the resulting molded tile shape.

12. The method of making an acoustical tile which comprises the steps of forming an intimate mixture of asbestos fibers and particles selected from the group consisting of vermiculite and perlite, first thoroughly coating said mixture with a fire-resistant water-repellent coating composition in the form of a water-soluble organic silicone resin, next thoroughly impregnating said mixture with a fire-resistant binder in the form of an aqueous solution of sodium silicate, placing the mixture thus prepared in a mold and forming it into an acoustical tile shape under pressure, and then drying the resulting molded tile shape.

13. A method according to claim 12 wherein the binder includes urea.

14. The method of making an acoustical tile comprising the steps of forming an intimate mixture of asbestos fibers and particles selected from the group consisting of vermiculite and perlite, first thoroughly coating said mixture with a fire-resistant water-repellent coating composition in the form of a water solution of the sodium salts of organosilanols and organosiloxanols, next thoroughly impregnating said mixture thus prepared with a fire-resistant silicious binder in the form of an aqueous solution of sodium silicate, placing the mixture thus prepared in a mold and forming it into an acoustical tile shape under pressure, drying the resulting molded tile shape, and then treating the resulting tile shape with a material selected from the group consisting of hydrochloric acid and water-soluble silico-fluorides.

15. A method according to claim 14 wherein the binder includes urea.

16. The method defined in claim 11 which includes the step of partially filling said mold with said mixture of asbestos fibers and particles as treated with said binder, applying over the surface of the mixture in the partially filled mold a layer of said mixture of asbestos fibers and particles as treated only with the said water-repellent coating composition, then filling said mold with said mixture of asbestos fibers and particles as treated with said binder, and then completing the molding and drying of said composition.

17. The method defined in claim 11 in which said mixture of asbestos fibers and particles as treated with the binder is compacted in one area of the mold to a density greater than in remaining areas of said mold before the mixture is subjected to final pressure in the mold.

18. The method defined in claim 11 in which said mixture of asbestos fibers and particles as treated with the binder are compacted in the outer peripheral marginal edge portions of the mold to a density greater than the same mixture has in an inner area of the mold before the entire mixture in the mold is subjected to final pressure in the mold and dried.

19. The method defined in claim 11 in which said mixture of asbestos fibers and particles as treated with the binder are compacted in the central area of the mold to a density greater than the density of the same mixture in the peripheral marginal edge portions of the mold before the entire mixture in the mold is subjected to final pressure in the mold and dried.

20. An acoustical tile as defined in claim 1 in which the said tile-shaped product includes an inner portion and a peripheral or marginal edge portion extending therearound and in which said peripheral or marginal edge portion is of a higher density than said inner portion but having the same composition.

21. An acoustical tile comprised of the dried, molded tile-shaped product of an intimate mixture of agglomerate bodies composed of particles selected from the group consisting of particles of vermiculite and perlite, said particles in the agglomerate bodies being bonded one to another by an internal substantially fire-resistant water-repellent binder adhesive, and said agglomerate bodies in the tile being bonded externally one to another by a substantially water-repellent fire-resistant binder.

22. An acoustical tile according to claim 21 wherein internal binder consists essentially of a silicone resin.

23. An acoustical tile according to claim 21 wherein the external binder consists essentially of sodium silicate.

24. The method of making an acoustical tile which comprises the steps of mixing in the presence of a substantially fire-resistant water-repellent binder adhesive individual finely divided particles selected from the group consisting of vermiculite and perlite, said mixing being continued until said individual particles are bonded together and balled-up into aggregate bodies each consisting of many of the individual particles bonded one to another by the adhesive, thereafter mixing the aggregate bodies in the presence of a substantially fire-resistant binder and subjecting the same to pressure to produce a densified tile product, and then drying said tile product.

25. The method of claim 24 in which the first-named binder consists essentially of a silicone resin and wherein the aggregate bodies are dried after being mixed with the silicone resin and before the second-named binder is mixed therewith.

26. The method of claim 25 in which the second-named binder consists essentially of sodium silicate.

27. The method of claim 26 in which the second-named binder includes urea and a water-soluble silico-fluoride.

28. An acoustical tile comprised of the dried molded tile-shaped product of an intimate mixture of asbestos base fibers and particles selected from the group consisting of vermiculite and perlite, which fibers and particles have as inner coated surfaces thereon a fire-resistant water-repellent composition adherent thereto and which bonds the asbestos fibers to the outside of said particles in a protective pile array to provide composite bodies, and which fibers and particles have as the next outer surfaces thereon a fire-resistant binder adherent to and overlying said inner coated surfaces and bonding the composite bodies together.

29. An acoustical tile as defined in claim 21 in which the said tile-shaped product is composed of portions of different densities but having the same composition.

30. An acoustical tile as defined in claim 21 in which the said tile-shaped product includes a central portion and a peripheral marginal edge portion extending therearound and of a higher density than the said central portion but having the same composition.

31. An acoustical tile as defined in claim 21 in which the said tile-shaped product is composed of a central portion and a marginal edge portion extending therearound and in which the said central portion is of a higher density than the said marginal edge portion but of the same composition.

References Cited in the file of this patent

UNITED STATES PATENTS

| | | |
|---|---|---|
| 1,985,994 | Holcomb | Jan. 1, 1935 |
| 2,021,359 | Halstead | Nov. 19, 1935 |
| 2,077,094 | Byers | Apr. 13, 1937 |
| 2,170,102 | Thompson | Aug. 22, 1939 |
| 2,195,587 | Snell | Apr. 2, 1940 |
| 2,326,763 | Crandell | Aug. 17, 1943 |
| 2,428,591 | Slayter | Oct. 7, 1947 |
| 2,445,415 | Anderson | July 20, 1948 |
| 2,481,391 | Campbell | Sept. 6, 1949 |
| 2,522,936 | Ferguson | Sept. 19, 1950 |
| 2,546,474 | Peyrot et al. | Mar. 27, 1951 |
| 2,574,915 | Fuller | Nov. 13, 1951 |
| 2,583,292 | Bowen et al. | Jan. 22, 1952 |
| 2,634,208 | Miscall et al. | Apr. 7, 1953 |
| 2,692,219 | Slayter et al. | Oct. 19, 1954 |
| 2,705,197 | Seybold | Mar. 29, 1955 |
| 2,706,723 | Bass | Apr. 19, 1955 |
| 2,762,738 | Teale | Sept. 11, 1956 |
| 2,769,202 | Thompson | Nov. 6, 1956 |
| 2,825,420 | Heine | Mar. 4, 1958 |
| 2,882,990 | Mustoe | Apr. 21, 1959 |
| 2,884,380 | Cook et al. | Apr. 28, 1959 |
| 2,933,147 | Stewart et al. | Apr. 19, 1960 |

FOREIGN PATENTS

| | | |
|---|---|---|
| 554,156 | Great Britain | June 22, 1943 |
| 631,856 | Great Britain | Nov. 10, 1949 |